(12) United States Patent
Mathew et al.

(10) Patent No.: US 12,429,086 B2
(45) Date of Patent: Sep. 30, 2025

(54) BEARINGS WITH GROOVES AND METHODS OF PRODUCING THE SAME

(71) Applicant: General Electric Company, Schenectady, NY (US)

(72) Inventors: Paul Mathew, Bengaluru (IN); Ravindra Shankar Ganiger, Bengaluru (IN); David Raju Yamarthi, Bengaluru (IN)

(73) Assignee: General Electric Company, Evendale, OH (US)

( * ) Notice: Subject to any disclaimer, the term of this patent is extended or adjusted under 35 U.S.C. 154(b) by 128 days.

(21) Appl. No.: 18/456,244

(22) Filed: Aug. 25, 2023

(65) Prior Publication Data

US 2025/0027537 A1  Jan. 23, 2025

(30) Foreign Application Priority Data

Jul. 17, 2023  (IN) .............................. 202311048001

(51) Int. Cl.
*F16C 17/02* (2006.01)
*F16C 17/04* (2006.01)

(52) U.S. Cl.
CPC .......... *F16C 17/024* (2013.01); *F16C 17/026* (2013.01); *F16C 17/042* (2013.01); *F16C 17/045* (2013.01); *F16C 2202/22* (2013.01); *F16C 2204/42* (2013.01); *F16C 2206/48* (2013.01); *F16C 2223/30* (2013.01); *F16C 2360/00* (2013.01)

(58) Field of Classification Search
CPC ...... F16C 17/02; F16C 17/024; F16C 17/026; F16C 17/04; F16C 17/042; F16C 17/045; F16C 37/002; F16C 2202/22; F16C 2204/42; F16C 2204/2206; F16C 2204/48; F16C 2223/30; F16C 2360/00; F16C 2360/23
See application file for complete search history.

(56) References Cited

U.S. PATENT DOCUMENTS

| | | |
|---|---|---|
| 2,893,703 A | 7/1959 | Richardson |
| 3,135,211 A | 6/1964 | Pezzillo |
| 6,241,394 B1 | 6/2001 | Kallenberger et al. |
| 6,398,418 B1 * | 6/2002 | Chang ..................... F16C 25/08 384/493 |
| 6,986,647 B2 | 1/2006 | Jones et al. |
| 8,397,506 B1 | 3/2013 | Wright et al. |
| 10,654,128 B2 | 5/2020 | Ledger et al. |
| 11,125,109 B2 | 9/2021 | Nayak et al. |
| 11,891,998 B2 | 2/2024 | Yamarthi et al. |
| 11,927,105 B1 | 3/2024 | Wangler et al. |
| 12,000,406 B2 | 6/2024 | Yamarthi et al. |
| 12,209,533 B2 | 1/2025 | Rodriguez Erdmenger et al. |
| 12,297,845 B2 | 5/2025 | Yamarthi et al. |

(Continued)

FOREIGN PATENT DOCUMENTS

| | | | | |
|---|---|---|---|---|
| BR | 112015027424 B1 * | 11/2021 | ............... | C08K 3/01 |
| JP | 2012127458 A * | 7/2012 | | |

*Primary Examiner* — Phillip A Johnson
(74) *Attorney, Agent, or Firm* — Hanley, Flight & Zimmerman, LLC

(57) ABSTRACT

A bearing having a bearing surface with a groove, the bearing positioned adjacent to a shaft, the groove facing the shaft, and a negative thermal expansion (NTE) material positioned in the groove, the NTE material at least partially filling the groove.

20 Claims, 10 Drawing Sheets

(56) References Cited

U.S. PATENT DOCUMENTS

| | | |
|---|---|---|
| 2019/0055843 A1 | 2/2019 | Berkson et al. |
| 2019/0195129 A1 | 6/2019 | Morris |
| 2021/0013759 A1 | 1/2021 | Torrey et al. |
| 2023/0008934 A1* | 1/2023 | Rasmussen ........... F16C 29/002 |
| 2023/0358235 A1 | 11/2023 | Yamarthi et al. |
| 2023/0358237 A1 | 11/2023 | Yamarthi et al. |
| 2023/0358242 A1 | 11/2023 | Raju et al. |
| 2023/0358247 A1 | 11/2023 | Yamarthi et al. |
| 2023/0358255 A1 | 11/2023 | Yamarthi et al. |
| 2024/0125271 A1 | 4/2024 | Yamarthi et al. |
| 2024/0167433 A1 | 5/2024 | Yamarthi et al. |
| 2024/0263671 A1 | 8/2024 | Raju et al. |
| 2024/0309882 A1 | 9/2024 | Yamarthi et al. |
| 2024/0337290 A1 | 10/2024 | M S et al. |

\* cited by examiner

BEARINGS WITH GROOVES AND METHODS OF PRODUCING THE SAME

RELATED APPLICATIONS

This patent claims the benefit of Indian Provisional Patent Application No. 202311048001, which was filed on Jul. 17, 2023. Indian Provisional Patent Application No. 202311048001 is hereby incorporated by reference in its entirety. Priority to India Provisional Patent Application No. 202311048001 is hereby claimed.

FIELD OF THE DISCLOSURE

This disclosure relates generally to fluid pumps, and, more particularly, to improved, more efficient pump design and operation.

BACKGROUND

Aircraft typically include various accessory systems supporting the operation of the aircraft and/or its gas turbine engine(s). For example, such accessory systems may include a lubrication system that lubricates components of the engine(s), an engine cooling system that provides cooling air to engine components, an environmental control system that provides cooled air to the cabin of the aircraft, and/or the like. As such, heat is added or removed from a fluid (e.g., oil, air, etc.) during operation of these accessory systems.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
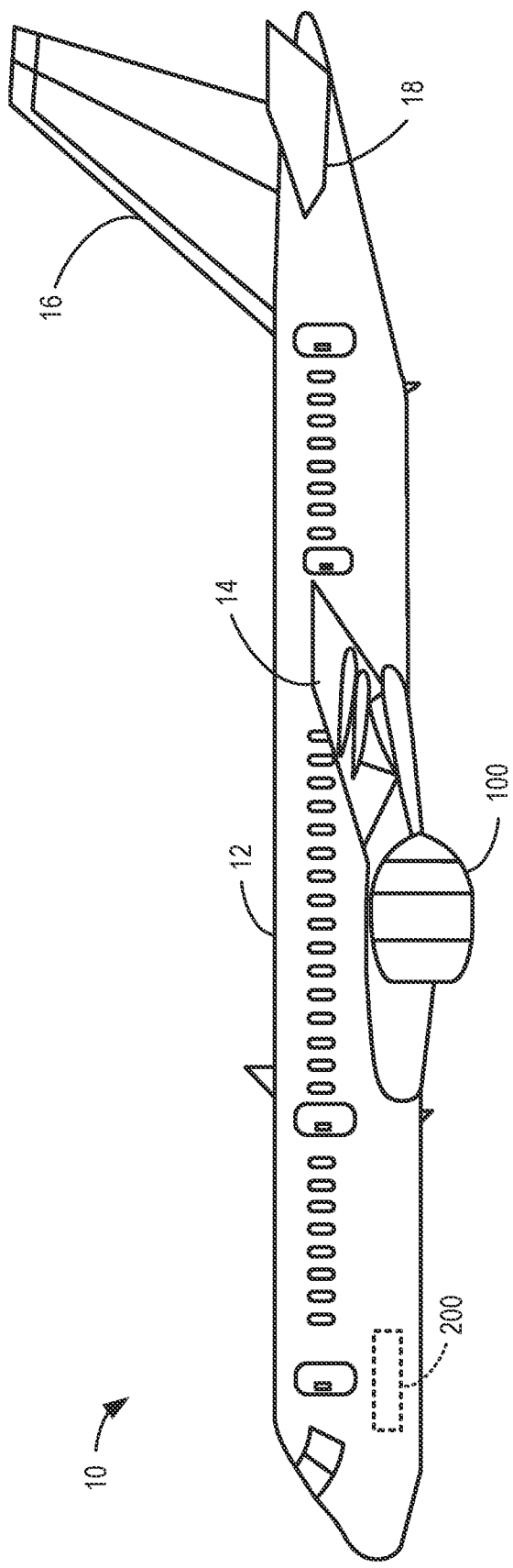
FIG. 1 is a side view of an example aircraft.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B. (5) A with C. (6) B with C, or (7) A with B and with C. As used herein in the context of describing structures, components, items, objects and/or things, the phrase "at least one of A and B" is intended to refer to implementations including any of (1) at least one A. (2) at least one B, or (3) at least one A and at least one B. Similarly, as used herein in the context of describing structures, components, items, objects and/or things, the phrase "at least one of A or B" is intended to refer to implementations including any of (1) at least one A. (2) at least one B, or (3) at least one A and at least one B.

As used herein in the context of describing the performance or execution of processes, instructions, actions, activities and/or steps, the phrase "at least one of A and B" is intended to refer to implementations including any of (1) at least one A. (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

The terms "forward" and "aft" refer to relative positions within a gas turbine engine, pump, or vehicle, and refer to the normal operational attitude of the gas turbine engine, pump, or vehicle. For example, with regard to a gas turbine engine, forward refers to a position closer to an engine inlet and aft refers to a position closer to an engine nozzle or exhaust. Further, with regard to a pump, forward refers to a position closer to a pump inlet and aft refers to a position closer to an end of the pump opposite the inlet.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

As used herein, in the context of describing the position and/or orientation of a first object relative to a second object, the term "substantially orthogonal" encompasses the term orthogonal and more broadly encompasses a meaning whereby the first object is positioned and/or oriented relative to the second object at an absolute angle of no more than five degrees (5°) from orthogonal. For example, a first axis that is substantially orthogonal to a second axis is positioned and/or oriented relative to the second axis at an absolute angle of no more than five degrees (5°) from orthogonal.

As used herein, "axially" is used to express a location along a central axis of a rotating body. For example, a shaft of a pump is said to extend axially along the axis of rotation of the pump. As used herein, "radially" is used to express a point or points along a radial vector originating at a central axis of a rotating body and pointing perpendicularly outward from the central axis. In some examples, fluid is said to accelerate radially outward from an impeller, meaning that the fluid flows outward from a central axis (axis of rotation) of the impeller at a direction that is substantially orthogonal to the central axis. As used here, "circumferentially" is used to express a location along an arc or circle positioned at a radial distance from the central axis of the rotating body. For example, the thrust disc is said to have a channel located circumferentially along the thrust disc.

A centrifugal fluid pump moves fluid (e.g., fuel, water, oil, supercritical carbon dioxide ($sCO_2$), etc.) through systems (e.g., waste heat recovery (WHR) systems) by converting rotational kinetic energy of an impeller to hydrodynamic energy of the flowing fluid. In other words, the angular velocity of the impeller is directly proportional to the flow rate of the flowing fluid exiting the pump. The impeller is provided a change in rotational kinetic energy from an electric motor applying mechanical work to an impeller shaft coupled to the impeller and to a rotor of an electric motor. The rotor is provided a change in mechanical work over a period of time (e.g., mechanical power) from a stator in the electric motor applying electromagnetic forces to the rotor in the form of torque. When the motor supplies a constant amount of electrical energy to the stator, then the rotor supplies a constant amount of mechanical energy to the impeller.

During operation of the pump, spinning of an impeller shaft and the associated impeller can cause the impeller shaft to radially vibrate within housing(s) of the pump. The pump housing(s) internally frame(s) radial bearings (e.g., hydrodynamic bearings, foil bearings, rolling-element bearings, etc.) to support radial loads (e.g., weight) of the impeller shaft and dampen the vibrations.

Also, during pump operations, the impeller shaft may experience axial loads that act generally parallel to the central axis of the pump and/or impeller shaft. Axial loads acting on the impeller can be unbalanced, meaning that a forward axial load (e.g., axial load acting toward a forward portion of the pump) and an aft axial load (e.g., axial load acting toward an aft portion of the pump) can be unequal and produce an axial thrust of the impeller shaft. A forward or an aft axial thrust can cause the impeller shaft to shift along the central axis and cause parts coupled to the impeller shaft (e.g., impeller, rotor shaft, motor armature, etc.) to contact the housing(s), the motor, and/or other internal parts of the pump. The pump housing(s) include(s) axial bearings (e.g., hydrodynamic bearings, foil bearings, etc.) that support axial thrusts of the impeller shaft and reduce, inhibit, and/or dampen such movements.

In some examples, the fluid (e.g., $sCO_2$, oil, liquid helium, etc.) that the pump pressurizes in the system can be used to lubricate the radial and/or axial bearings to reduce frictional forces between rotating elements within those bearings. For example, the pump can include flowlines leading from a pump outlet to the axial bearings to provide and/or transmit pressurized fluid to a thrust bearing. As used herein, a "flowline" can refer to a path (e.g., a flowpath, flow direction, etc.) of the fluid and/or a structure (e.g., pipe, casing, etc.) used to enclose (e.g., direct, guide, etc.) the fluid.

The pressurized fluid flows in between a thrust disc, a forward thrust pad, and an aft thrust pad of the thrust bearing apparatus, system, and/or assembly. The thrust disc is coupled to the impeller shaft and protrudes radially outward from the impeller shaft, and the thrust pads are coupled to the pump housing(s) and protrude radially inward toward the impeller shaft. Furthermore, the pump can include expeller vanes to drive the fluid from internal portions of the pump housing to the pump outlet. In some examples, expeller vanes protrude from an aft side of the impeller and function similarly to impeller vanes. That is, fluid approaches the expeller vanes along the central axis and accelerates radially outward from the expeller vanes. Thus, the flowlines and the expeller vanes can implement a lubricating circuit from the pump outlet to the axial bearing(s) and back to the expeller vanes to provide a continuous flow of the fluid to the axial load bearings.

During operation of the pump, axial thrust of the impeller shaft can act in forward or aft directions based on interactions between the impeller vanes/expeller vanes and the fluid. The fluid enters through the pump inlet along a central/rotating/shaft axis toward the impeller, which includes the impeller vanes to accelerate the fluid radially outward into a pump outlet, chamber, flowline, casing, etc. Fluid pressure on a forward side, end portion, face, etc., of the impeller can transfer aft axial loads to the impeller shaft in the aft direction.

Similarly, the fluid in the pump housing flows forward along the axis of rotation of the impeller shaft and builds up pressure on an aft side, end portion, face, etc. of the impeller (e.g., the expeller). Fluid pressure on an aft side of the impeller can transfer forward loads to the impeller shaft in the forward direction.

When the forward and aft axial loads are of equal values and act in opposite directions, the pump is said to be "thrust balanced." As used herein, "forward thrust" refers to unbalanced thrust of the impeller shaft acting in the forward direction due to the forward axial load exceeding the aft axial load. As used herein, "aft thrust" refers to unbalanced thrust of the impeller shaft acting in the aft direction due to the aft axial load exceeding the forward axial load.

In some examples, when the pump operates at substantially low rotational speeds, angular velocities, operating speeds, etc. (e.g., 500, 1,000, 2,500 rpm, etc.), the fluid pressure at the pump inlet exceeds the fluid pressure within the pump housing(s). Thus, at substantially low operating speeds ("low speeds"), aft thrust of the impeller shaft is induced.

In some examples, when the pump operates at substantially high rotational speeds, angular velocities, operating speeds, etc. (e.g., 5000, 10,000, 25,000 revolutions per minute (rpm), etc.), the fluid pressure within the pump housing(s) exceeds the fluid pressure at the pump inlet. Thus, at substantially high operating speeds ("high speeds"), forward thrust of the impeller shaft is induced.

When forward thrust or aft thrust is applied to the impeller shaft, axial displacement (e.g., in forward or aft directions) of the impeller shaft from an initial position can occur by some amount (e.g., 0.001, 0.005, 0.010 inches (in), etc.) despite the axial support of the thrust bearing(s). At some operational speeds of the pump, the axial thrust acting on the impeller shaft can oscillate between forward and aft directions. At such speeds, the thrust can oscillate at frequencies that known thrust bearings are incapable of adaptively and/or dynamically supporting or cannot support quickly, efficiently, and/or adequately enough. Example thrust bearings that are unable to balance pressure may fail to keep appropriate spacing between thrust pads, spacers, thrust discs, etc. In such examples, damage to thrust pads, thrust discs, impeller shafts, or other pump components can result.

Example systems disclosed herein reduce the amount of axial movement that the impeller shaft experiences due to forward and aft thrusts. Example bearing systems disclosed herein can increase the spacing between the impeller shaft and a radial bearing, the spacing between the thrust disc and corresponding thrust bearings, etc. Thus, examples disclosed herein can reduce a frequency or magnitude at which the impeller shaft or parts coupled thereto physically contact other part(s) and/or housing(s) of the pump. For example, examples disclosed herein employ a negative thermal expansion (NTE) coating (e.g., material, insert, etc.) deposited in grooves to generate a gap between pump components (e.g., the shaft, radial bearings, thrust disc, thrust bearings, thrust pads, etc.). Furthermore, example systems disclosed herein can improve the operational efficiency of the pump (e.g., centrifugal $sCO_2$ pump) by minimizing or otherwise reducing frictional energy losses associated with axial impeller shaft movement. Furthermore, the example systems disclosed herein can increase the time between maintenance services to repair and/or replace component(s) of the thrust bearing(s), motor, pump, etc. Examples disclosed herein are described for use with pump systems. However, examples disclosed herein may be implemented in compressor systems, turbines, electric motors, electric generators, pump starters, hydrogen pump systems, etc.

For the figures disclosed herein, identical numerals indicate the same elements throughout the figures. Referring now to the drawings, FIG. 1 is a side view of an example aircraft 10. As shown in FIG. 1, the aircraft 10 includes a fuselage 12 and a pair of wings 14 (one is shown) extending outward from the fuselage 12. In the illustrated example, a gas turbine engine 100 is supported on each wing 14 to propel the aircraft through the air during flight. Additionally, the aircraft 10 includes a vertical stabilizer 16 and a pair of horizontal stabilizers 18 (one is shown). However, in some examples, the aircraft 10 includes engines of different types and/or in different positions than the illustrative example of FIG. 1.

Furthermore, the aircraft 10 can include a thermal management system 200 for transferring heat between fluids supporting the operation of the aircraft 10. More specifically, the aircraft 10 can include one or more accessory systems configured to support the operation of the aircraft 10. For example, such accessory systems include a lubrication system that lubricates components of the engines 100, a cooling system that provides cooling air to components of the engines 100, an environmental control system that provides cooled air to the cabin of the aircraft 10, and/or the like. In such examples, the thermal management system 200 is configured to transfer heat from one or more fluids supporting the operation of the aircraft 10 (e.g., the oil of the lubrication system, the air of the cooling system and/or the environmental control system, and/or the like) to one or more other fluids supporting the operation of the aircraft 10 (e.g., the fuel supplied to the engines 100). However, in some other examples, the thermal management system 200 is configured to transfer heat between another fluid or component supporting the operation of the aircraft 10.

Although examples disclosed herein are described with reference to the aircraft 10 of FIG. 1, examples disclosed herein can be applicable to another type or configuration of aircraft that uses a thermal management system substantially similar to the thermal management system 200 of FIGS. 1-3. Thus, the present subject matter can be readily adaptable to another aircraft and/or another heat transfer application associated with another type of vehicle.

Figure 2:
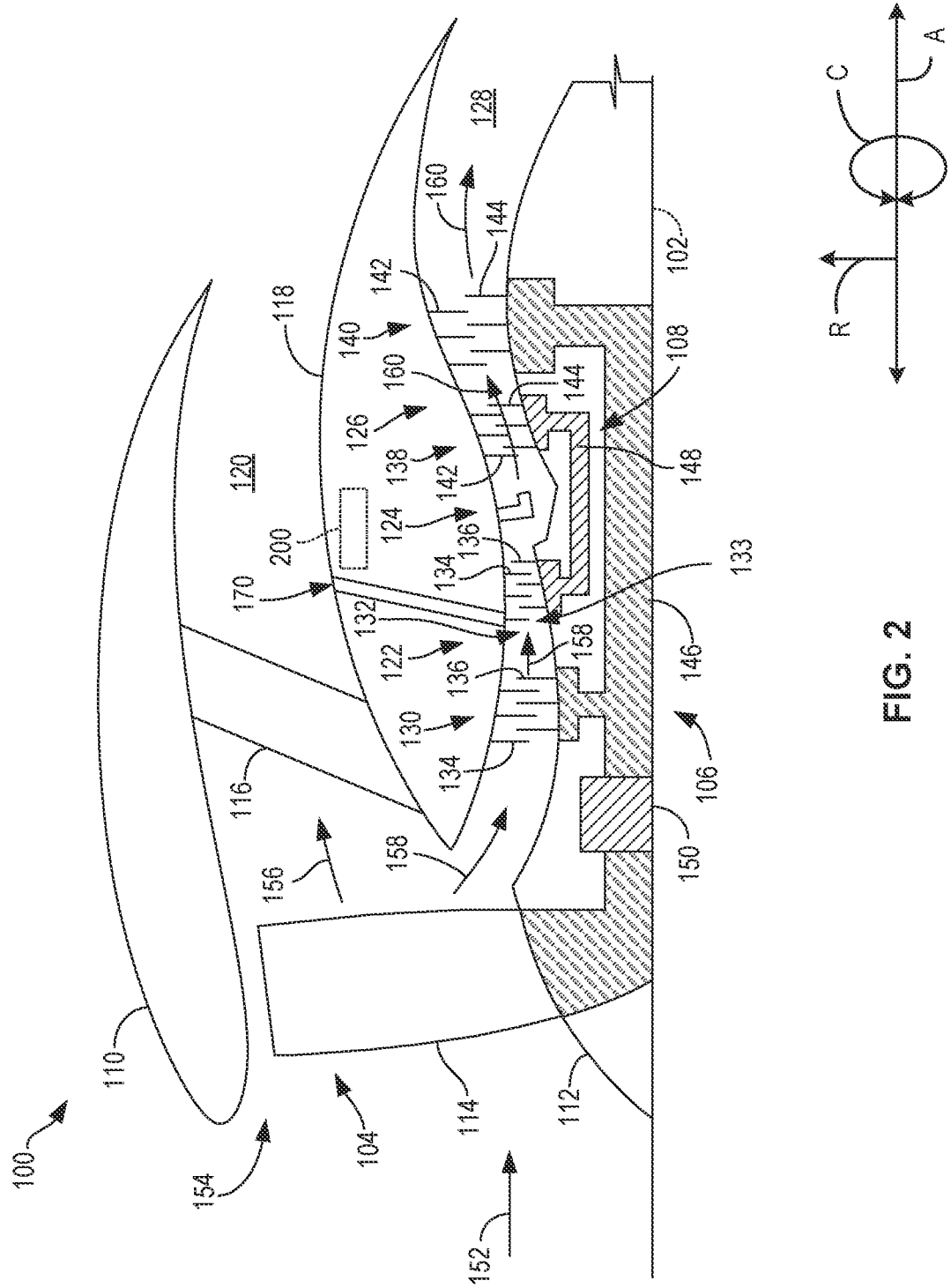
FIG. 2 is a schematic cross-sectional view of an example gas turbine engine of an aircraft.

FIG. 2 is a schematic cross-sectional view of an example gas turbine engine 100. In the illustrated example, the engine 100 is configured as a high-bypass turbofan engine. However, in some examples, the engine 100 is configured as a propfan engine, a turbojet engine, a turboprop engine, a turboshaft gas turbine engine, etc.

In general, the engine 100 extends along an axial centerline 102 and includes a fan 104, a low-pressure (LP) spool 106, and a high pressure (HP) spool 108 at least partially encased by an annular nacelle 110. More specifically, the fan 104 can include a fan rotor 112 and a plurality of fan blades 114 (one is shown) coupled to the fan rotor 112. In this respect, the fan blades 114 are circumferentially spaced apart and extend radially outward from the fan rotor 112. Moreover, the LP and HP spools 106, 108 are positioned downstream from the fan 104 along the axial centerline 102. As shown, the LP spool 106 is rotatably coupled to the fan rotor 112, which permits the LP spool 106 to rotate the fan blades 114. Additionally, a plurality of outlet guide vanes or struts 116 circumferentially spaced apart from each other and extend radially between an outer casing 118 surrounding the LP and HP spools 106, 108 and the nacelle 110. As such, the struts 116 support the nacelle 110 relative to the outer casing 118 such that the outer casing 118 and the nacelle 110 define a bypass airflow passage 120 positioned therebetween.

The outer casing 118 generally surrounds or encases, in serial flow order, a compressor section 122, a combustion section 124, a turbine section 126, and an exhaust section 128.

In some examples, the compressor section 122 includes a low-pressure (LP) compressor 130 of the LP spool 106 and a high-pressure (HP) compressor 132 of the HP spool 108 positioned downstream from the LP compressor 130 along the axial centerline 102. Each compressor 130, 132 can, in turn, include one or more rows of compressor stator vanes 134 interdigitated with one or more rows of compressor rotor blades 136. As such, the compressors 130, 132 define a compressed air flow path 133 extending therethrough.

Moreover, in some examples, the turbine section 126 includes a high-pressure (HP) turbine 138 of the HP spool 108 and a low-pressure (LP) turbine 140 of the LP spool 106 positioned downstream from the HP turbine 138 along the axial centerline 102. Each turbine 138, 140 can, in turn, include one or more rows of turbine stator vanes 142 interdigitated with one or more rows of turbine rotor blades 144.

Additionally, the LP spool 106 includes a low-pressure (LP) shaft 146 and the HP spool 108 includes a high-pressure (HP) shaft 148 positioned concentrically around the LP shaft 146. In such examples, the HP shaft 148 rotatably couples the turbine rotor blades 144 of the HP turbine 138 and the compressor rotor blades 136 of the HP compressor 132 such that rotation of the turbine rotor blades 144 of the HP turbine 138 rotatably drives the compressor rotor blades 136 of the HP compressor 132. As shown, the LP shaft 146 is directly coupled to the turbine rotor blades 144 of the LP turbine 140 and the compressor rotor blades 136 of the LP compressor 130. Furthermore, the LP shaft 146 is coupled to the fan 104 via a gearbox 150. In this respect, the rotation of the turbine rotor blades 144 of the LP turbine 140 rotatably drives the compressor rotor blades 136 of the LP compressor 130 and the fan blades 114.

In some examples, the engine 100 generates thrust to propel an aircraft. More specifically, during operation, air 152 enters an inlet portion 154 of the engine 100. The fan 104 supplies a first portion 156 of the air 152 to the bypass airflow passage 120 and a second portion 158 of the air 152 to the compressor section 122. The second portion 158 of the air 152 first flows through the LP compressor 130 in which the compressor rotor blades 136 therein progressively compress the second portion 158 of the air 152. Next, the second portion 158 of the air 152 flows through the HP compressor 132 in which the compressor rotor blades 136 therein continue to progressively compress the second portion 158 of the air 152. The compressed second portion 158 of the air 152 is subsequently delivered to the combustion section 124. In the combustion section 124, the second portion 158 of the air 152 mixes with fuel and burns to generate high-temperature and high-pressure combustion gases 160. Thereafter, the combustion gases 160 flow through the HP turbine 138 which the turbine rotor blades 144 of the HP turbine 138 extract a first portion of kinetic and/or thermal energy therefrom. This energy extraction rotates the HP shaft 148, which drives the HP compressor 132. The combustion gases 160 then flow through the LP turbine 140 in which the turbine rotor blades 144 of the LP turbine 140 extract a second portion of kinetic and/or thermal energy therefrom. This energy extraction rotates the LP shaft 146, which drives the LP compressor 130 and the fan 104 via the gearbox 150. The combustion gases 160 then exit the engine 100 through the exhaust section 128.

As mentioned above, the aircraft 10 can include a thermal management system 200 for transferring heat between fluids supporting the operation of the aircraft 10. In this respect, the thermal management system 200 can be positioned within the engine 100. For example, as shown in FIG. 2, the thermal management system 200 is positioned within the outer casing 118 of the engine 100. However, in some other examples, the thermal management system 200 is positioned at another location within the engine 100.

Furthermore, in some examples, the engine 100 defines a third-stream flow path 170. In general, the third-stream flow path 170 extends from the compressed air flow path 133 defined by the compressor section 122 to the bypass airflow passage 120. In this respect, the third-stream flow path 170 allows a portion of the second portion 158 of the air 152 from the compressor section 122 to bypass the combustion section 124. More specifically, in some examples, the third-stream flow path 170 defines a concentric or non-concentric passage relative to the compressed air flow path 133 downstream of one or more of the compressors 130, 132 or the fan 104. The third-stream flow path 170 can be configured to selectively remove the second portion 158 of the air 152 from the compressed air flow path 133 via one or more variable guide vanes, nozzles, or other actuatable flow control structures.

In addition, as will be described below, in some examples, the thermal management system 200 transfers heat to the air flowing through the third-stream flow path 170. However, a pressure and/or a flow rate of a fluid (e.g., a heat exchange fluid such as a supercritical fluid (e.g., $sCO_2$, etc.)) within the thermal management system 200 limits a rate at which thermal energy is transferred between the air and the heat exchange fluid. Additionally, it is advantageous for the thermal management system 200 to produce the pressure and/or the flow rate with pumps that support axial thrusts of the shaft within the pump to improve the lifespan and/or efficiency of the pump(s) and the thermal management system 200.

Although examples disclosed herein are described with reference to the gas turbine engine 100 of FIG. 2, examples disclosed herein can be applicable to another type or configuration of engine that uses a thermal management system substantially similar to the thermal management system 200 of FIGS. 1-3. Thus, the present subject matter can be readily adaptable to another engine and/or another heat transfer application associated with another type of vehicle.

Figure 3:
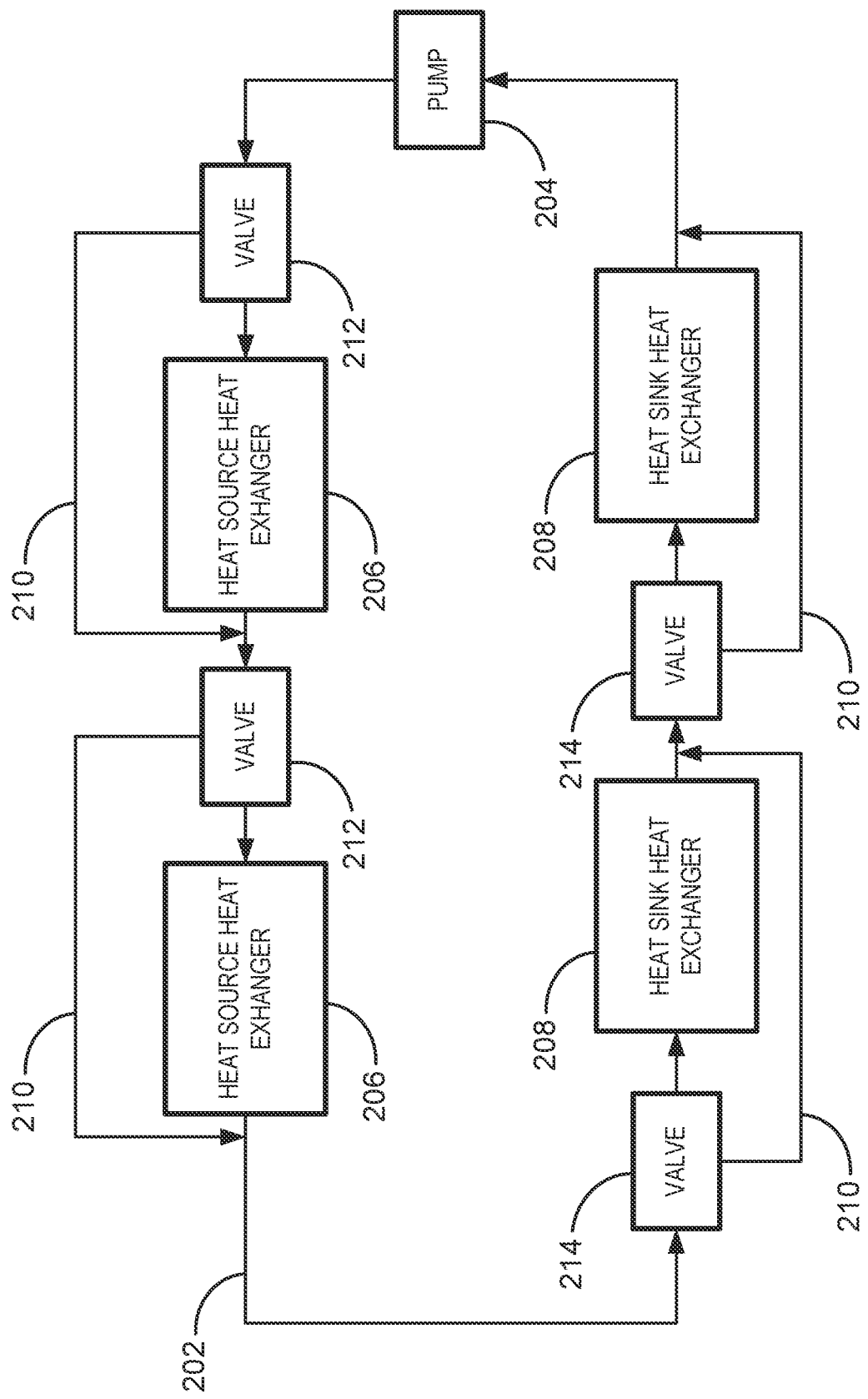
FIG. 3 is a schematic diagram of an example thermal management system for transferring heat between fluids.

FIG. 3 is a schematic view of an example implementation of the thermal management system 200 for transferring heat between fluids. In general, the thermal management system 200 is discussed in the context of the aircraft 10 and the gas turbine engine 100 described above and shown in FIGS. 1 and 2. However, the thermal management system 200 can be implemented within another type of aircraft and/or another gas turbine engine of another configuration.

As shown, the thermal management system 200 includes a thermal transport bus 202. Specifically, in some examples, the thermal transport bus 202 is configured as one or more fluid conduits through which a fluid (e.g., a heat exchange fluid) flows. As described below, the heat exchange fluid flows through various heat exchangers such that heat is added to and/or removed from the heat exchange fluid. In this respect, the heat exchange fluid can be a working fluid, such as $sCO_2$, oil, liquid helium, etc. Moreover, in such examples, the thermal management system 200 includes a pump 204 configured to pump the heat exchange fluid through the thermal transport bus 202.

Additionally, the thermal management system 200 includes one or more heat source heat exchangers 206 arranged along the thermal transport bus 202. More specifically, the heat source heat exchanger(s) 206 is fluidly coupled to the thermal transport bus 202 such that the heat exchange fluid flows through the heat source heat exchanger(s) 206. In this respect, the heat source heat exchanger(s) 206 is configured to transfer heat from fluids supporting the operation of the aircraft 10 to the heat exchange fluid, which cools the fluids supporting the operation of the aircraft 10. Thus, the heat source heat exchanger(s) 206 adds heat to the heat exchange fluid. Although FIG. 3 illustrates two heat source heat exchangers 206, the thermal management system 200 can include a single heat source heat exchanger 206 or three or more heat source heat exchangers 206.

The heat source heat exchanger(s) 206 can correspond to many configurations of heat exchanger(s) that cool a fluid supporting the operation of the aircraft 10. In some examples, at least one of the heat source heat exchangers 206 is a heat exchanger(s) of the lubrication system(s) of the engine(s) 100. In such examples, the heat source heat exchanger(s) 206 transfers heat from the oil lubricating the engine(s) 100 to the heat transfer fluid. In some other examples, at least one of the heat source heat exchangers 206 is a heat exchanger(s) of the cooling system of the engine(s) 100. In such examples, the heat source heat exchanger(s) 206 transfers heat from the cooling air bled from the compressor section(s) 122 (or a compressor discharge plenum) of the engine(s) 100 to the heat transfer fluid. However, in some other examples, the heat source heat exchanger(s) 206 corresponds to other types of heat exchangers that cool a fluid supporting the operation of the aircraft 10.

Furthermore, the thermal management system 200 includes a plurality of heat sink heat exchangers 208 arranged along the thermal transport bus 202. More specifically, the heat sink heat exchangers 208 are fluidly coupled to the thermal transport bus 202 such that the heat exchange fluid flows through the heat sink heat exchangers 208. In this respect, the heat sink heat exchangers 208 are configured to transfer heat from the heat exchange fluid to other fluids supporting the operation of the aircraft 10, which heats the other fluids supporting the operation of the aircraft 10. Thus, the heat sink heat exchangers 208 remove heat from the heat exchange fluid. Although FIG. 3 illustrates two heat sink heat exchangers 208, the thermal management system 200 can include three or more heat sink heat exchangers 208.

The heat sink heat exchangers 208 can correspond to many configurations exchangers that heat a fluid supporting the operation of the aircraft 10. For example, at least one of the heat sink heat exchangers 208 is a heat exchanger(s) of the fuel system(s) of the engine(s) 100. In such examples, the heat sink heat exchanger(s) 208 transfers heat from the heat transfer fluid to the fuel supplied to the engine(s) 100. In some other examples, at least one of the heat sink heat exchangers 208 is a heat exchanger(s) in contact with the first portion 156 of the air 152 flowing through the bypass airflow passage(s) 120 of the engine(s) 100. In such examples, the heat sink heat exchanger(s) 208 transfers heat from the heat exchange fluid to the first portion 156 of the air 152 flowing through the bypass airflow passage(s) 120.

In some examples, one or more of the heat sink heat exchangers 208 are configured to transfer heat to the air flowing through the third-stream flow path 170. In such examples, the heat sink heat exchanger(s) 208 is in contact with the air flow through the third-stream flow path 170 (FIG. 2). Thus, heat from the heat exchange fluid flowing through the thermal transport bus 202 can be transferred to the air flow through the third-stream flow path 170. The use of the third-stream flow path 170 as a heat sink for the thermal management system 200 provides one or more technical advantages. For example, the third-stream flow path 170 provides greater cooling than other sources of bleed air because a larger volume of air flows through the third-stream flow path 170 than other bleed air flow paths. Moreover, the air flowing through third-stream flow path 170 is cooler than the air flowing through other bleed air flow paths and the compressor bleed air. Additionally, the air in the third-stream flow path 170 is pressurized, which allows the heat sink heat exchanger(s) 208 to be smaller than heat exchangers relying on other heat sinks within the engine 100. Furthermore, in examples in which the engine 100 is unducted, using the third-stream flow path 170 as a heat sink does not increase drag on the engine 100 unlike the use of ambient air (e.g., a heat exchanger in contact with air flowing around the engine 100). However, in some other examples, the heat sink heat exchangers 208 correspond to other types of heat exchangers that heat a fluid supporting the operation of the aircraft 10.

Moreover, in some examples, the thermal management system 200 includes one or more bypass conduits 210. Specifically, as shown, each bypass conduit 210 is fluidly coupled to the thermal transport bus 202 such that the bypass conduit 210 allows at least a portion of the heat exchange fluid to bypass one of the heat exchangers 206, 208. In some examples, the heat exchange fluid bypasses one or more of the heat exchangers 206, 208 to adjust the temperature of the heat exchange fluid within the thermal transport bus 202. The flow of example heat exchange fluid through the bypass conduit(s) 210 is controlled to regulate the pressure of the heat exchange fluid within the thermal transport bus 202. In the illustrated example of FIG. 3, each heat exchanger 206, 208 has a corresponding bypass conduit 210. However, in some other examples, other numbers of heat exchangers 206, 208 can have a corresponding bypass conduit 210 as long as there is at least one bypass conduit 210.

Additionally, in some examples, the thermal management system 200 includes one or more heat source valves 212 and one or more heat sink valves 214. In general, each heat source valve 212 is configured to control the flow of the heat exchange fluid through a bypass conduit 210 that bypasses a heat source heat exchanger 206. Similarly, each heat sink valve 214 is configured to control the flow of the heat exchange fluid through a bypass conduit 210 that bypasses a heat sink heat exchanger 208. In this respect, each valve 212, 214 is fluidly coupled to the thermal transport bus 202 and a corresponding bypass conduit 210. As such, each valve 212, 214 can be moved between fully and/or partially opened and/or closed positions to selectively occlude the flow of heat exchange through its corresponding bypass conduit 210.

The valves 212, 214 are controlled based on the pressure of the heat exchange fluid within the thermal transport bus 202. More specifically, as indicated above, in certain instances, the pressure of the heat exchange fluid flowing through the thermal transport bus 202 can fall outside of a desired pressure range. When the pressure of the heat exchange fluid is too high, the thermal management system 200 can incur accelerated wear. In this respect, when the pressure of the heat exchange fluid within the thermal transport bus 202 exceeds a maximum or otherwise increased pressure value, one or more heat source valves 212 open. In such examples, at least a portion of the heat exchange fluid flows through the bypass conduits 210 instead of the heat source heat exchanger(s) 206. Thus, less heat is added to the heat exchange fluid by the heat source heat exchanger(s) 206, which reduces the temperature and, thus, the pressure of the fluid. In some examples, the maximum pressure value is between 3800 and 4000 pounds per square inch or less. In some examples, the maximum pressure value is between 2700 and 2900 pounds per square inch, such as 2800 pounds per square inch. In some other examples, the maximum pressure value is between 1300 and 1500 pounds per square inch, such as 1400 pounds per square inch. Such maximum pressure values generally prevent the thermal management system 200 from incurring accelerated wear.

In some examples, the maximum pressure value is set prior to and/or during operation based on one or more parameters (e.g., materials utilized, pump 204 design, aircraft 10 design, gas turbine engine 100 design, heat exchange fluid, etc.) associated with the thermal management system 200. The example maximum pressure value can be adjusted relative to the pressure capacities of the thermal transport bus 202, the pump 204, the heat exchangers 206, 208, the bypass conduit(s) 210, and/or the valves 212, 214.

Conversely, when the pressure of the heat exchange fluid is too low, the pump 204 can experience operability problems and increased wear. As such, when the pressure of the heat exchange fluid within the thermal transport bus 202 falls below a minimum or otherwise reduced pressure value, one or more of the heat sink valves 214 open. In such examples, at least a portion of the heat exchange fluid flows through the bypass conduits 210 instead of the heat sink heat exchangers 208. Thus, less heat is removed from the heat exchange fluid by the heat sink heat exchangers 208, which increases the temperature and, thus, the pressure of the fluid. In some examples, the minimum pressure value is 1070 pounds per square inch or more. In some examples, the minimum pressure value is between 1150 and 1350 pounds per square inch, such as 1250 pounds per square inch. In some other examples, the minimum pressure value is between 2400 and 2600 pounds per square inch, such as 2500 pounds per square inch. Such minimum pressure values are generally utilized when the heat exchange fluid is in a supercritical state (e.g., when the heat exchange fluid is carbon dioxide).

As such, the thermal management system 200 can be configured to operate such that the pressure of the heat transport fluid is maintained with a range extending between the minimum and maximum pressure values. In some examples, the range extends from 1070 to 4000 pounds per square inch. Specifically, in one example, the range extends from 1250 to 1400 pounds per square inch. In some other examples, the range extends from 2500 to 2800 pounds per square inch.

Accordingly, the operation of the pump 204 and the valves 212, 214 allows the disclosed thermal management system 200 to maintain the pressure of the heat exchange fluid within the thermal transport bus 202 within a specified range of values as the thermal load placed on the thermal management system 200 varies.

Furthermore, the example pump 204 drives the flow of the heat exchange fluid through the thermal management system 200. In some examples, the thermal management system 200 includes one pump 204 or multiple pumps 204 depending on the desired flow rate, delta pressure across the pump 204, and/or the kinetic energy loss of the heat exchange fluid in the thermal transport bus 202. For example, the pump 204 can increase the output pressure head to accelerate the flow of the heat exchange fluid to a first flowrate. As the heat exchange fluid passes through the thermal transport bus 202, the example kinetic energy of the heat exchange fluid dissipates due to friction, temperature variations, etc. Due to the kinetic energy losses, the heat exchange fluid decelerates to a second flow rate at some point upstream of the pump 204. When the example second flow rate is below a desired operating flow rate of the heat exchange fluid, the pump 204 can either be of a different architecture that outputs a higher first flow rate, or one or more additional pumps 204 can be included in the thermal management system 200.

Figure 4:
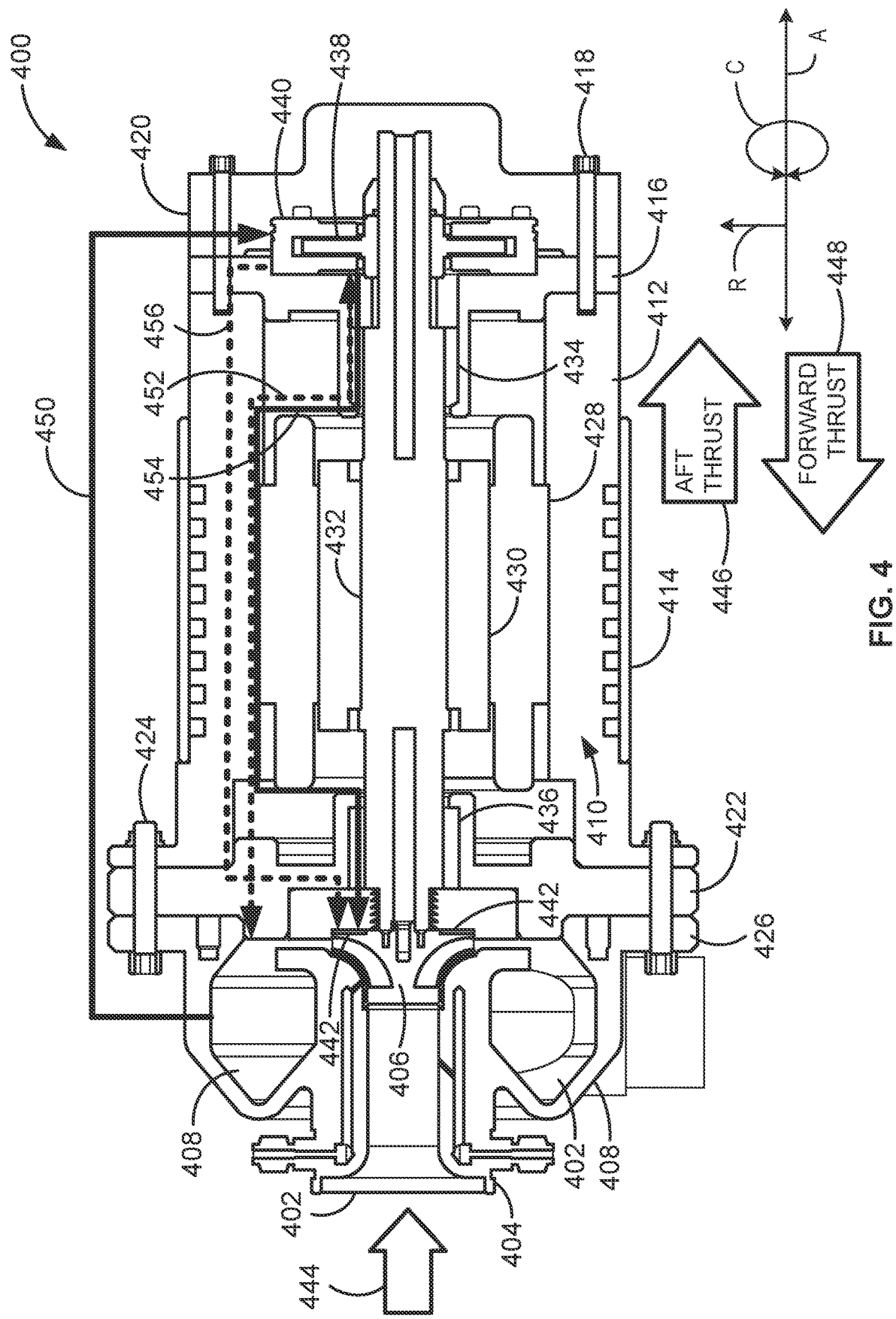
FIG. 4 is a schematic illustration of an example thermal transport bus pump.

FIG. 4 is a schematic illustration of an example thermal transport bus pump 400 (e.g., a $sCO_2$ pump, the pump 204 of FIG. 3, etc.). In the illustrated example of FIG. 4, the thermal transport bus pump 400 drives a heat exchange fluid, such as $sCO_2$, through one or more fluid conduits (e.g., the thermal transport bus 202 of FIG. 3) 402. Specifically, the heat exchange fluid flows through an inlet pipe 404 and encounters an impeller 406 (e.g., a compressor wheel) that rotates to drive the heat exchange fluid through a pump outlet 408 fluidly coupled to the fluid conduit(s) 402. In turn, the fluid conduit(s) 402 can feed the heat exchange fluid to one or more heat exchangers (e.g., the heat exchanger 206, 208 of FIG. 3). Accordingly, the thermal transport bus pump 400 can pump the heat exchange fluid to manage a thermal energy of working fluids associated with the aircraft 10 of FIG. 1 and/or the gas turbine engine 100 of FIG. 2.

In the illustrated example of FIG. 4, the thermal transport bus pump 400 includes a motor 410 positioned in a motor housing 412. In FIG. 4, the motor 410 is an induction motor operatively coupled to a variable frequency drive (VFD) and controlling circuitry (not shown), such as a full authority digital engine control (FADEC), that controls a rotational speed of the motor 410. For example, the controlling circuitry can operate the motor 410 based on a pressure and/or a temperature of the heat exchange fluid in the fluid conduit(s) 402 and/or in the thermal transport bus pump 400. In some examples, the controlling circuitry can operate the motor 410 based on a pressure and/or a temperature of the working fluids affected by the heat exchange fluid. Additionally or alternatively, the controlling circuitry can operate the motor 410 based on vibration measurements obtained by accelerometers operatively coupled to the thermal transport bus pump 400 and/or the fluid conduit(s) 402.

In FIG. 4, the motor housing 412 is at least partially surrounded by a cooling jacket 414 to prevent the motor 410 from overheating. An aft end of the motor housing 412 is coupled to an aft bearing housing 416 via first bolts 418. Furthermore, an end cap 420 is coupled to the aft bearing housing 416 via the first bolts 418. A forward end of the motor housing 412 is coupled to a forward bearing housing 422 opposite the aft bearing housing 416 via second bolts 424. Moreover, the forward bearing housing 422 is coupled to a backplate 426 and the pump outlet 408 on an opposite side of the backplate 426 via the second bolts 424.

In the illustrated example of FIG. 4, the motor 410 includes a stator 428 to induce alternating electrical currents in field coils and emit alternating magnetic fields about a central axis of the motor 410. The alternating magnetic fields interact with permanent magnets of a rotor 430 and, in turn, provide torque to the rotor 430. The rotor 430 is fixedly coupled to an impeller shaft 432 ("shaft 432"), and the shaft is fixedly coupled to the impeller 406. As such, the motor 410 drives a rotation of the shaft 432 and, in turn, a rotation of the impeller 406. An aft end of the shaft 432 is supported by a first radial foil bearing 434, which is coupled to the aft bearing housing 416. Similarly, a forward end of the shaft 432 is supported by a second radial foil bearing 436 coupled to the forward bearing housing 422.

The first radial foil bearing 434 and the second radial foil bearing 436 include spring-loaded foil journal linings that support radial loads of the shaft 432 during substantially low (e.g., startup) rotational speeds (e.g., 0-5,000 rotations per minute (rpm), etc.). When the motor 410 causes the shaft 432 to rotate at a substantially high (e.g., operational) rotational speed (e.g., 5000-20,000 rpm, etc.), a pressure of the working medium (e.g., air, oil, $sCO_2$, etc.) increases and pushes the foil lining radially outward. Thus, the pressurized working medium supports the radial loads of the shaft 432 when the shaft 432 is rotating at operational speeds (e.g., 3000 rpm, 10,000 rpm, 25,000 rpm, etc.).

In the illustrated example of FIG. 4, a thrust disc 438 of the shaft 432 is supported by a thrust bearing system 440. For example, the thrust bearing system 440 can include foil bearings to support axial loads of the shaft 432 via interactions with the thrust disc 438. In some examples, the thrust bearing system 440 is coupled to the aft bearing housing 416 and/or the end cap 420 via bolts.

The example impeller 406 of the thermal transport bus pump 400 includes expeller vanes 442 on an aft portion of the impeller 406. At operational speeds of the motor 410, the expeller vanes 442 cause the working fluid (e.g., $sCO_2$) to flow forward from the forward bearing housing 422, motor housing 412, etc. into the fluid conduit 402.

In the illustrated example of FIG. 4, the example $sCO_2$ fluid flows into the thermal transport bus pump 400 by way of the fluid conduit 402 as illustrated with an arrow indicating a flow direction 444. At low speeds (e.g., startup speeds) of the motor 410, the flow direction 444 of the example $sCO_2$ imparts an aft thrust 446 on the impeller 406 and the shaft 432 as illustrated with an arrow indicating a direction of the aft thrust 446. At high speeds (e.g., operational speeds) of the motor 410, the expeller vanes 442 drive the heat exchange fluid inside the thermal transport bus pump 400 forward toward the pump outlet 408, and the fluid generates a forward thrust 448 on the impeller 406 and the shaft 432 as illustrated with an arrow indicating a direction of the forward thrust 448. The thrust bearing system 440 is included in the thermal transport bus pump 400 to support the aft and forward thrusts 446, 448 of the shaft 432.

In some examples, the thermal transport bus pump 400 includes an example outer flowline 450 that diverges from the pump outlet 408 to provide $sCO_2$ as a working medium to the thrust bearing system 440 and to support the thrust disc 438 when pressurized. Additionally or alternatively, the outer flowline 450 diverges from the fluid conduit 402 and/or the expeller vanes 442. The example outer flowline 450 can circumvent one or more of the motor housing 412, the aft bearing housing 416, the forward bearing housing 422, and/or the backplate 426 to access the thrust bearing system 440.

In some examples, the thermal transport bus pump 400 includes an example inner flowline 452 that diverges from the expeller vanes 442 to provide $sCO_2$ as a working medium to the thrust bearing system 440 and to support the thrust disc 438 when pressurized. Additionally or alternatively, the inner flowline 452 diverges from the fluid conduit 402 and/or the pump outlet 408. The example inner flowline 452 can pass through one or more of the motor housing 412, the aft bearing housing 416, the forward bearing housing 422, and/or the backplate 426 to access the thrust bearing system 440.

The outer and inner flowlines 450, 452 of FIG. 4 are illustrated as example configurations to reflect general locations of the flowlines and directions of the flow. Although both the outer and inner flowlines 450, 452 are illustrated in FIG. 4, only one may be included in the thermal transport bus pump 400 to achieve a same function. The thermal transport bus pump 400 can be configured with the outer flowline 450 to reduce complication during fabrication and/or assembly and to reduce risk of internal leakages. The thermal transport bus pump 400 can be configured with the inner flowline 452 to reduce an amount of space the thermal transport bus pump 400 occupies. Also illustrated in FIG. 4 are first return flowline(s) 454 and second return flowline(s) 456 to generally depict exit points and flow directions of the working fluid from the thrust bearing system 440 to the expeller vanes 442.

In the illustrated example of FIG. 4, the thrust disc 438 and the thrust bearing system 440 are designed such that forward and aft bearing capacities are not dynamically adjusted to account for fluctuations between aft and forward thrusts 446, 448. In other words, there may be no dynamic subsystems in the thrust bearing system 440 to dynamically change axial support of a forward or an aft side of the thrust disc 438 in response transition(s) from the aft thrust 446 to the forward thrust 448 and vice versa. Examples disclosed herein include apparatus and systems to dynamically support axial loads in forward and/or aft directions (e.g., aft and/or forward thrusts 446, 448) based on a fluid pressure changes on forward and aft sides of a thrust disc. Further, the example radial foil bearings 434, 436 are designed such that low rotational speed of the shaft 432 may not produce sufficient hydrodynamic lift between the shaft 432 and the radial foil bearings 434, 436. In other words, at low operating speeds, there may be little to no gap (e.g., spacing) between the shaft 432 and each of the radial foil bearings 434, 436, which may result in wear or damage to the shaft 432, the first radial foil bearing 434, the second radial foil bearing 436, etc. Examples disclosed herein include apparatus and systems to support low or high rotational speeds of an example impeller shaft.

Figure 5:
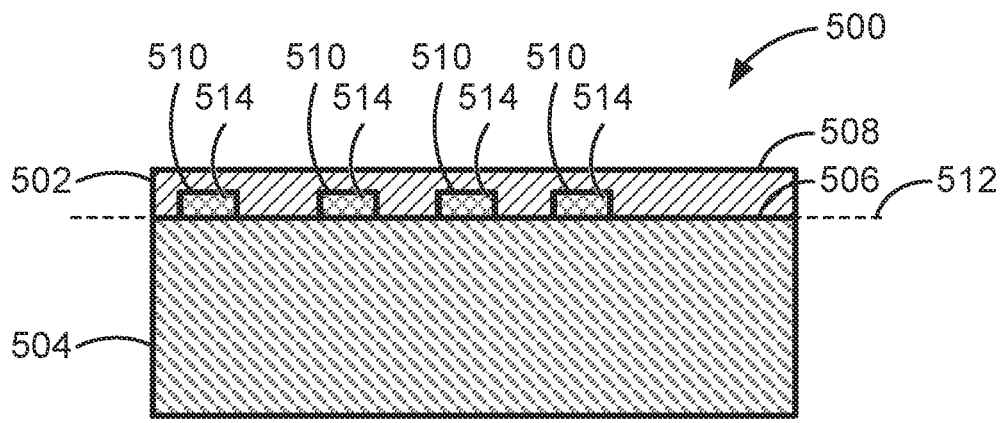
FIGS. 5 and 6 illustrate an example assembly in accordance with the teachings disclosed herein.
Figure 6:
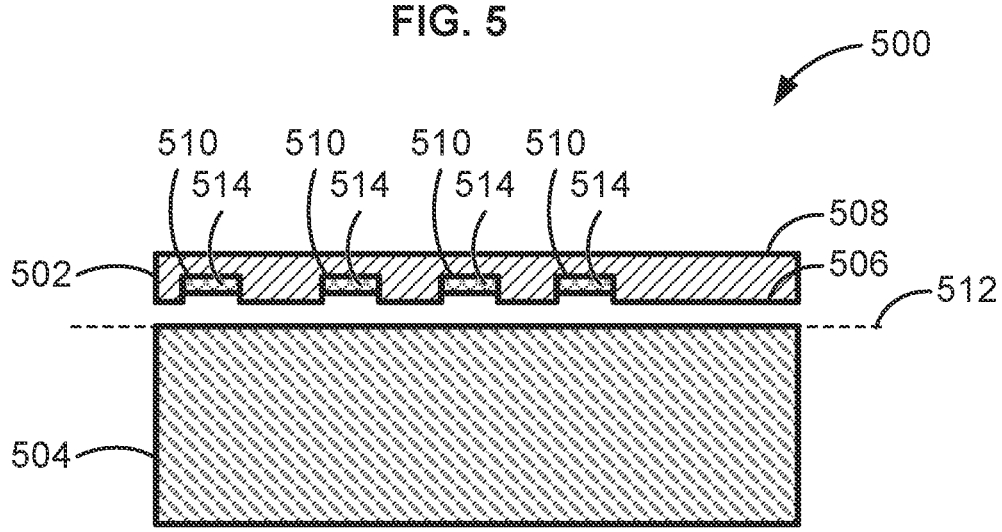

FIGS. 5 and 6 illustrate cross-sectional views of an example assembly 500 constructed in accordance with the teachings disclosed herein. The example assembly 500 includes an example bearing (e.g., bearing portion) 502 adjacent to an example shaft (e.g., shaft portion) 504. In some examples, the bearing 502 can be implemented as at least one of the foil bearings 434, 436 (FIG. 4) and the shaft 504 can be implemented as the shaft 432 (FIG. 4). In some examples, the bearing 502 can be implemented as at least one of the foil bearings in the thrust bearing system 440 (FIG. 4) and the shaft 504 can be implemented as the thrust disc 438 (FIG. 4). In other words, the assembly 500 of FIGS. 5 and 6 can be included in the example thermal transport bus pump 400 of FIG. 4.

The example bearing 502 includes a first example surface (e.g., bearing surface) 506 opposing a second example surface 508. The first example surface 506 includes example grooves (also referred to as cavities, indentations, depressions, etc.) 510. In FIGS. 5 and 6, the first example surface 506 is an inner surface of the bearing 502 facing the shaft 504. The example grooves 510 face the shaft 504. In some examples, the first surface 506 can at least partially surround an example longitudinal axis 512 of the assembly 500. In this example, the shaft 504 is aligned to the longitudinal axis 512. As shown in FIGS. 5 and 6, the example grooves 510 extend from the first surface 506 towards the second surface 508. In some examples, the grooves 510 can extend in a radial direction from the first surface 506 to the second surface 508. The example assembly 500 includes the four grooves 510. However, the example assembly 500 can include any number of grooves (e.g., at least one, two, three, five, etc.).

In some examples, the bearing 502 is a radial bearing that surrounds the shaft 504, as described in detail below in connection with at least FIGS. 7, 14, and 15. Additionally or alternatively, the example bearing 502 can be implemented as a thrust bearing (e.g., thrust pad) that surrounds an example thrust disc. In such examples, the example shaft 504 can be implemented as an example thrust disc, as described in detail below in connection with at least FIGS. 8-13 and 16.

The example assembly 500 includes an example NTE material (e.g., coating) 514 positioned (e.g., deposited) in each of the grooves 510. As shown in FIGS. 5 and 6, the example NTE material 514 at least partially fills each of the grooves 510. In some examples, the NTE material 514 is coated on (e.g., covering) internal surfaces (e.g., one or more walls) of the grooves 510. Further, the example grooves 510 include an approximately equal (e.g., within 0.5 micron (μ)) amount or depth of the NTE material 514. However, each of the example grooves 510 can include different amounts of the NTE material 514. For example, a first one of the grooves 510 can include a 1 micron depth of NTE material 514, a second one of the grooves 510 can include a 2 micron depth of the NTE material 514, etc. In some examples, the NTE material 514 includes at least one of zirconium tungstate ($Zr(WO_4)_2$), zirconium vanadate ($ZrV_2O_7$), or niobium-titanium (Nb—Ti).

As shown in FIG. 5, the example bearing 502 can contact (e.g., rub against) the example shaft 504 during operation. For example, contact between the bearing 502 and the shaft 504 can occur when the shaft 504 rotates (e.g., in a range from 12,000 revolutions per minute (rpm) to 17,000 rpm). Such contact or rotation can increase heat transfer (e.g., the relative temperature, windage heating, etc.) between the bearing 502 and the shaft 504. In some examples, contact between the shaft 504 and the bearing 502 can occur when the shaft 504 is angled or tilted towards the bearing 502.

In FIG. 5, the example grooves 510 may be partially filled with the NTE material 514 such that the grooves 510 include (e.g., contain) fluid (e.g., air) and the NTE material 514. The example NTE material 514 shrinks (e.g., contracts, reduces in size, etc.) in response to increases in temperature (e.g., when the bearing 502 contacts moving surrounding thermal fluid). In this example, shrinkage of the NTE material 514 allows for fluid to enter the grooves 510 and push against the NTE material 514, the walls of the grooves 510, and the bearing 502 to induce a gap (e.g., fluid film, hydrodynamic lift, etc.) between the bearing 502 and the shaft 504 (as shown in FIG. 6). In other words, an increase in heat transfer between the bearing 502 and the shaft 504 causes the NTE material 514 to shrink which, in turn, enables fluid flow into and out of the grooves 510 such that a fluid film forms between the bearing 502 and the shaft 504. As such, the example assembly 500 of FIGS. 5 and 6 can generate a fluid air gap in response to contact/rubbing of the bearing 502 and the shaft 504. Additionally, the example assembly 500 of FIGS. 5 and 6 can limit or prevent heat transfer between the bearing 502 and the shaft 504, which improves the performance and life of the assembly 500. In some examples, the fluid film induced between the shaft 504 and the bearing 502 can balance or level the shaft 504 within the assembly 500.

In response to increased local temperature (e.g., 273 Kelvin (K) to 1400 K) generated by contact between the bearing 502 and the shaft 504, the NTE material 514 reduces from a first size (shown in FIG. 5) to a second size (shown in FIG. 6). In some examples, each of the grooves 510 may include approximately the same amount (e.g., within. 5 micron) of NTE material 514 after the NTE material 514 has contracted. However, each of the grooves 510 may include different amounts of NTE material 514 after the NTE material 514 contracts. For example, a first one of the grooves 510 may be positioned closer to a high temperature region of the assembly 500 (e.g., a region that is prone to contact between the shaft 504 and the bearing 502) and a second one of the grooves 510 may be positioned farther from that high temperature region. Prior to contraction, the example NTE material 514 positioned in the first one of the grooves 510 and the example NTE material 514 positioned in the second one of the grooves 510 may both be 2 microns. The NTE material 514 positioned in the first one of the grooves 510 may shrink from 2 microns to 0.5 microns (e.g., 1.5 micron shrinkage) in response to the increase in temperature, and the NTE material 514 positioned in the second one of the grooves 510 may shrink from 2 microns to 1.5 microns (e.g., 0.5 micron shrinkage). Thus, there may be a greater amount of the NTE material 514 in the second one of the grooves 510 compared to the amount of the NTE material 514 in the first one of the grooves 510 after formation of the fluid film based on the proximity of the first one of the grooves 510 to the high temperature region.

Figure 7:
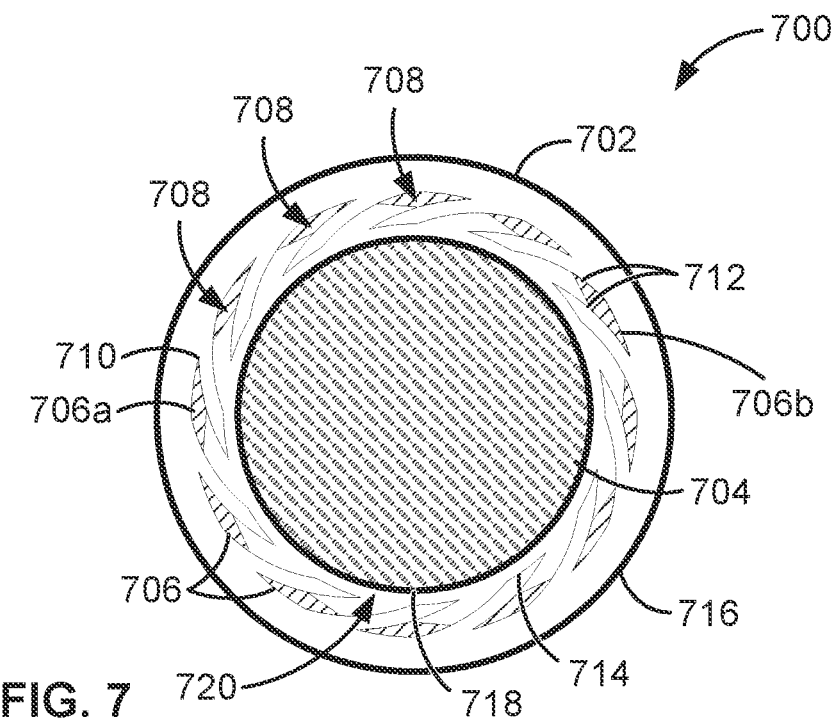
FIG. 7 illustrates an example radial bearing system in accordance with the teachings disclosed herein.

FIG. 7 illustrates an axial view of an example assembly 700 constructed in accordance with the teachings disclosed herein. The example assembly 700 includes an example radial bearing 702 ("bearing 702") surrounding an example shaft 704. The example radial bearing 702 includes example grooves 706 having example NTE material 708 disposed therein. The example assembly 700 includes the twelve grooves 706. However, the example assembly 500 can include any number of grooves (e.g., two, ten, fifteen, etc.). As shown in the example of FIG. 7, each of the grooves 706 may include different amounts of the NTE material 708. Further, the example NTE material 708 may be positioned at different locations within each of the grooves 706. For example, a first one of the example grooves 706a includes the NTE material 708 positioned at an example vertex 710 of the groove 706a. Additionally, a second one of the example grooves 706b includes the NTE material 708 positioned at example walls 712 of the groove 706b. In this example, the grooves 706 are positioned on an example inner surface 714 of the bearing 702. The example grooves 706 extend radially from the inner surface 714 to an outer surface 716 of the bearing 702. Additionally, the example grooves 706 extend circumferentially along a direction defined by the inner surface 714 such that the grooves 706 surround (e.g., encircle, trace, etc.) an example circumferential surface 718 of the shaft 704.

In FIG. 7, the example shaft 704 is spaced apart from the bearing 702 defining an example fluid film 720 therebetween. However, during operation the shaft 704 may move closer to or contact the bearing 702. For example, the shaft 704 may be an impeller shaft of a pump (e.g., the impeller shaft 432 of the thermal transport bus pump 400 of FIG. 4). In such examples, the shaft 704 can be coupled to a rotor of a motor (e.g., the motor 410 of FIG. 4). Accordingly, rotation of the shaft 704 can cause the shaft 704 to move relative to the bearing 702 (e.g., laterally within the bearing 702). The contact or friction between the shaft 704 and the bearing 702 can increase a local temperature within the assembly 700 that can, in turn, cause the NTE material 708 to contract. Similar to the assembly 500 of FIGS. 5 and 6, the example assembly 700 of FIG. 7 enables fluid flow into and out of the grooves 706 such that the fluid film 720 forms between the bearing 702 and the shaft 704. In particular, shrinkage of the NTE material 708 due to an increase in temperature permits increased fluid flow. In some examples, the formation of the fluid film 720 between the bearing 702 and the shaft 704 can cause the shaft 704 to return (e.g., move) to a center position within the bearing 702 (as generally shown in FIG. 7). In some examples, the bearing 702 can be positioned forward of an example motor (e.g., the motor 410 of FIG. 4). Additionally or alternatively, the bearing 702 can be positioned aft of an example motor (e.g., the motor 410 of FIG. 4). As such, the example assembly 700 can balance the shaft 704 along the length of an example pump.

Figure 8:
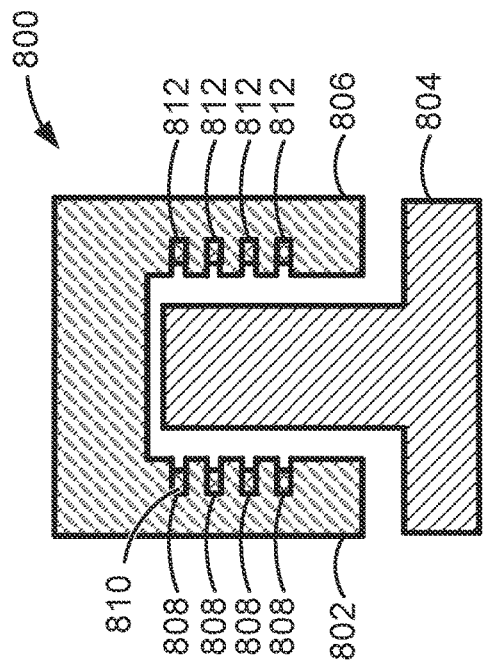
FIGS. 8-10 illustrate an example thrust bearing system in accordance with the teachings disclosed herein.
Figure 10:
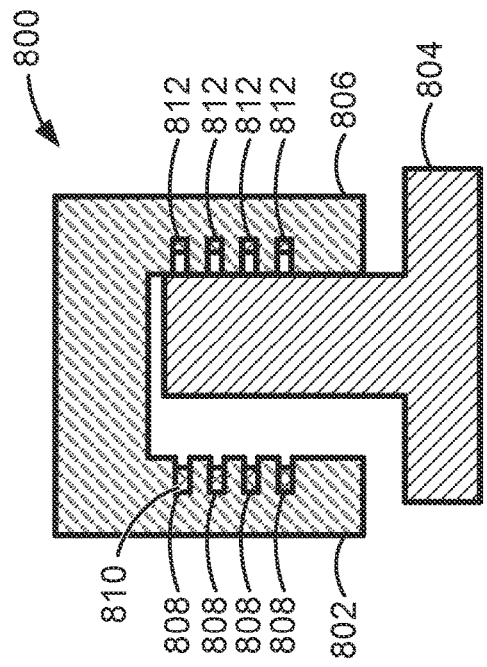
Figure 9:
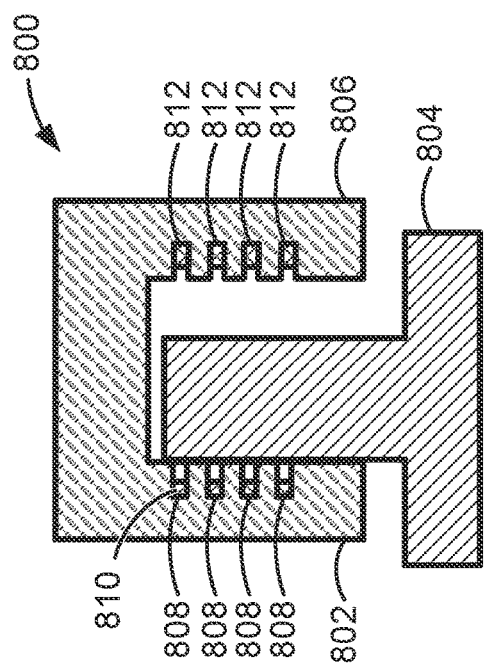

FIGS. 8-10 illustrate an example thrust bearing system 800 in accordance with the teachings disclosed herein. The example thrust bearing system 800 includes an example forward thrust bearing (e.g., pad) 802 positioned on a forward side of an example thrust disc 804 and an example aft thrust bearing 806 positioned on an aft side of the thrust disc 804. In some examples, the thrust disc 804 is coupled to an impeller shaft of a pump (e.g., the impeller shaft 432 of the thermal transport bus pump 400). In some examples, the thrust bearing system 800 can be positioned forward of a motor in an example pump. Additionally or alternatively, the thrust bearing system 800 can be positioned aft of a motor in an example pump. The example thrust bearings 802, 806 of FIGS. 8-10 are similar to the example bearing 502 of FIGS. 5 and 6. However, the example thrust bearings 802, 806 (e.g., example top foils) may partially surround the thrust disc 804. The example forward thrust bearing 802 includes example grooves 808 with example NTE material 810 disposed therein. Additionally, the example aft thrust bearing 806 includes example grooves 812 with example NTE material 810 disposed therein.

For purposes of explanation, the example thrust bearing system 800 is described in connection with a pump system, wherein the thrust disc 804 is coupled to an impeller shaft of a pump (e.g., the impeller shaft 432 of the thermal transport bus pump 400). However, the example thrust bearing system 800 can be described in connection with turbomachinery (e.g., impeller systems, compressor systems, turbine systems, diffuser systems, etc.), gearbox bearings, electrical machinery (e.g., motor, generator, etc.), electronic equipment, motors, dental grinding units, or any other system. Turning to FIG. 9, a forward displacement of the thrust disc 804 due to forward thrust of an example impeller shaft can cause the thrust disc 804 to move forward in the thrust bearing system 800. In such examples, the thrust disc 804 moves closer to the forward thrust bearing 802 such that the thrust disc 804 contacts the forward thrust bearing 802. The contact or friction between the thrust disc 804 and the forward thrust bearing 802 can increase a local temperature within the thrust bearing system 800 that can, in turn, cause the NTE material 810 in the grooves 808 of the forward thrust bearing 802 to contract. Similar to the assembly 500 of FIGS. 5 and 6 and the example assembly 700 of FIG. 7, the thrust bearing system 800 enables fluid flow into and out of the grooves 808 such that a fluid film can form between the forward thrust bearing 802 and the thrust disc 804. In some examples, the formation of a fluid film between the forward thrust bearing 802 and the thrust disc 804 can cause the thrust disc 804 to return (e.g., move) to a center position (as generally shown in FIG. 8).

Turning to FIG. 10, an aft displacement of the thrust disc 804 due to aft thrust of an example impeller shaft can cause the thrust disc 804 to move aft in the thrust bearing system 800. In such examples, the thrust disc 804 moves closer to the aft thrust bearing 806 such that the thrust disc 804 contacts the aft thrust bearing 806. The contact or friction between the thrust disc 804 and the aft thrust bearing 806 can increase a local temperature within the thrust bearing system 800 that can, in turn, cause the NTE material 810 in the grooves 812 of the aft thrust bearing 806 to contract. This enables fluid flow into and out of the grooves 812 such that a fluid film can form between the aft thrust bearing 806 and the thrust disc 804. In some examples, the generation of a fluid film between the aft thrust bearing 806 and the thrust disc 804 can cause the thrust disc 804 to return to a center position (as generally shown in FIG. 8). In the example of FIGS. 8-10, the thrust bearings 802, 806 include the example grooves 808, 812 and NTE material 810. However, the example thrust disc 804 may also include example grooves with NTE material disposed therein, described in detail below in connection with FIG. 11.

Figure 11:
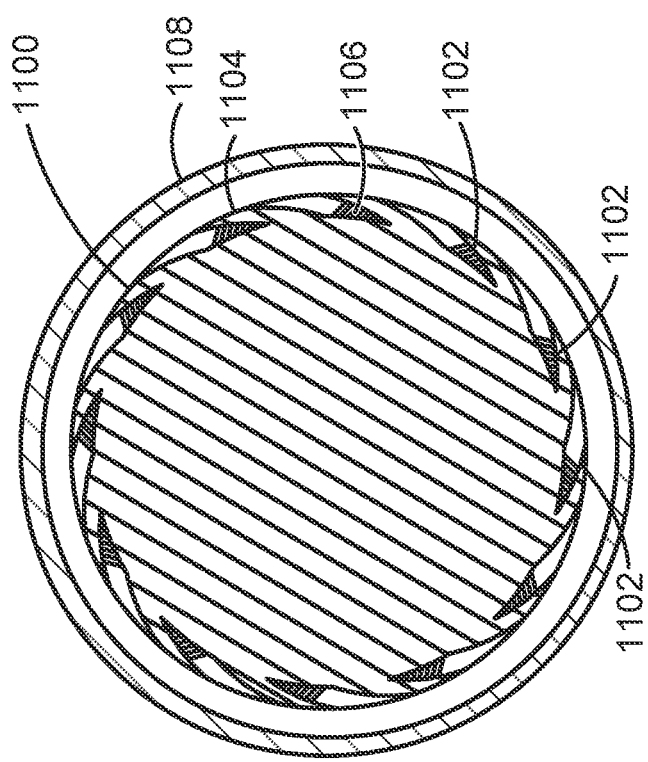

FIG. 11 is a cross-section of an example thrust disc 1100 in accordance with teachings disclosed herein. The example thrust disc 1100 includes example grooves 1102 positioned on an example outer surface 1104 of the thrust disc 1100. In some examples, the outer surface 1104 faces an example bearing 1108 (e.g., the forward thrust bearing 802, the aft thrust bearing 806, etc. of FIGS. 8-10). The example grooves 1102 include example NTE material 1106 disposed therein. Accordingly, the contact or friction between the thrust disc 1100 and the bearing 1108 can increase a local temperature between the bearing 1108 and the thrust disc 1100 that can, in turn, cause the NTE material 1106 in the grooves 1102 of the thrust disc 1100 to contract. As such, fluid flow into and out of the grooves 1102 of the thrust disc 1100 can generate a fluid film between the thrust disc 1100 and the bearing 1108. In some examples, the thrust disc 1100 may also represent a shaft, wherein the shaft has the grooves 1102 positioned on the outer surface 1104 with the NTE material 1106 disposed therein.

Figure 13:
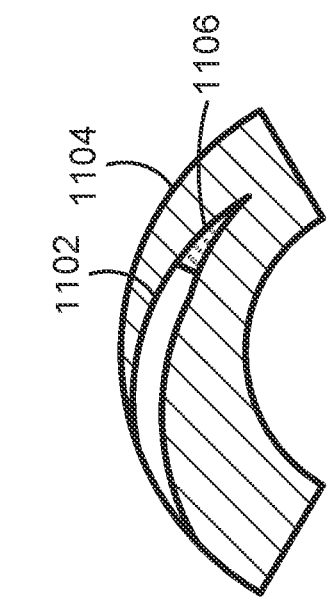
FIGS. 11-13 illustrate an example thrust disc in accordance with the teachings disclosed herein.
Figure 12:
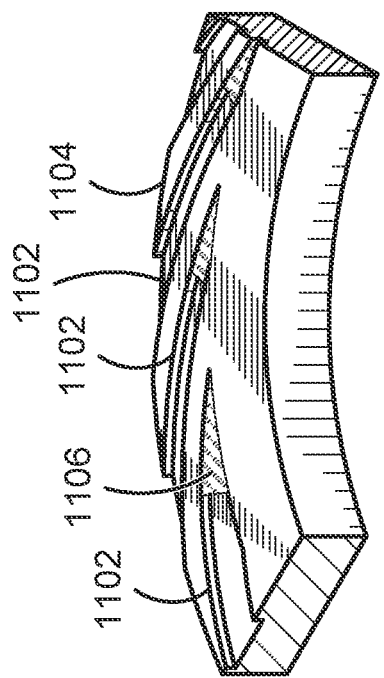

FIGS. 12 and 13 are detailed views of a portion of the example thrust disc 1100 of FIG. 11. The example grooves 1102 can be etched into the outer surface 1104 with the NTE material 1106 disposed therein. Further, the example grooves 1102 can extend from the outer surface 1104 towards an inner portion of the thrust disc 1100. In some examples, the grooves 1102 can track (e.g., span, traverse, etc.) a circumferential surface (e.g., the outer surface 1104). Additionally or alternatively, the example grooves 1102 can extend radially inward from the outer surface 1104. As shown in FIGS. 11-13, the example grooves 1102 can each exhibit a generally triangular shape, with a vertex formed at an end of each groove. However, the example grooves 1102 can exhibit any shape (e.g., rectangular, oval, etc.). Further, the example grooves 1102 are shown in FIGS. 12 and 13 with similar depths or sizes. However, the example grooves 1102 can vary in depth or size. Additionally, the example grooves 1102 are shown to be evenly spaced around the outer surface 1104. However, the example grooves 1102 can be randomly spaced or spaced at various distances with respect to the outer surface 1104.

Figure 14:
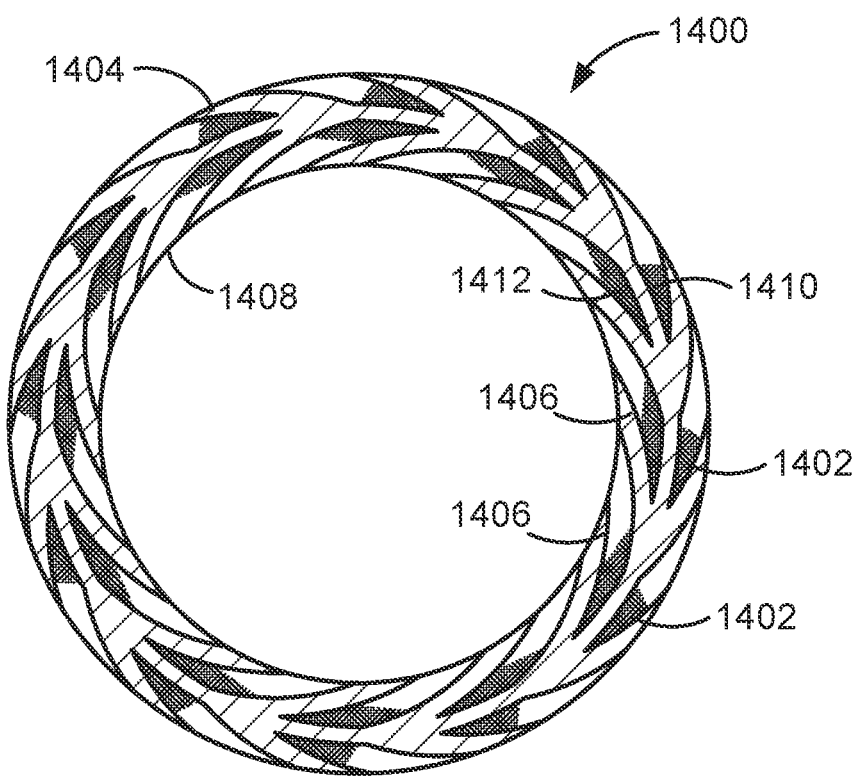
FIGS. 14 and 15 illustrate an example bearing in accordance with the teachings disclosed herein.

FIG. 14 is a cross-section of an example bearing 1400 in accordance with teachings disclosed herein. The example bearing 1400 includes example grooves 1402 positioned on an example outer surface 1404 of the bearing 1400 and example grooves 1406 positioned on an example inner surface 1408 of the bearing 1400. Further, the example grooves 1402 include example NTE material 1410 disposed therein and the example grooves 1406 include example NTE material 1412 disposed therein. Accordingly, the example bearing 1400 can maintain a fluid film between an example shaft positioned within the inner surface 1408 and the example bearing 1400. Additionally or alternatively, the example bearing 1400 can maintain a fluid film between another example bearing or structure positioned adjacent to the example bearing 1400. As such, the example bearing 1400 can generate a fluid film surrounding the outer surface 1404 and a fluid film surrounding the inner surface 1408 due to the NTE materials 1410, 1412 contracting within the corresponding grooves 1402, 1406.

Figure 15:
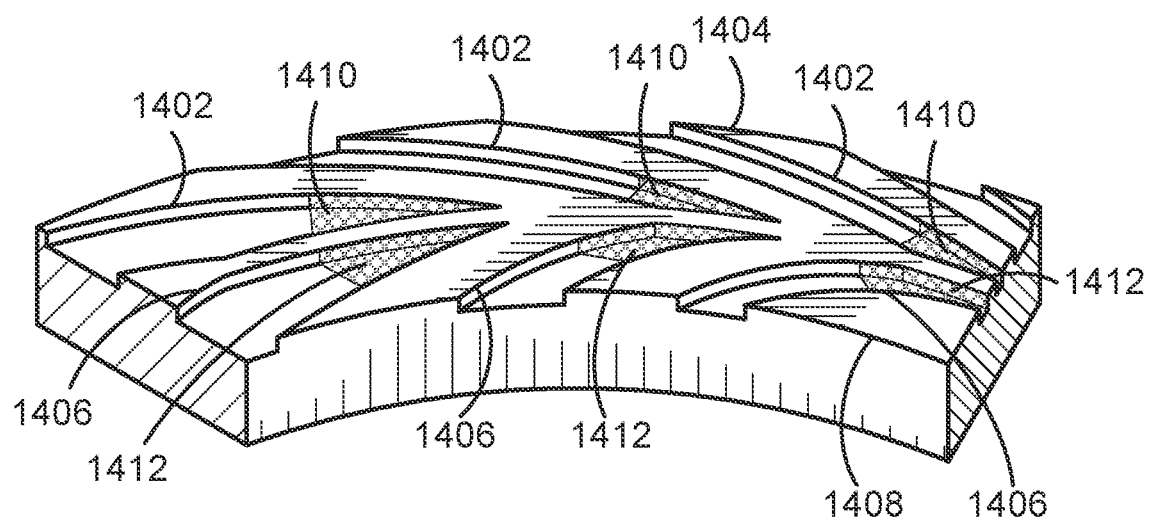

FIG. 15 is a detailed view of a portion of the example bearing 1400 of FIG. 14. The example grooves 1406 can be etched into the inner surface 1408 with the NTE material 1412 disposed therein. Further, the example grooves 1402 can be etched into the outer surface 1404 with the NTE material 1410 disposed therein. As shown in FIG. 15, the example grooves 1406 extend towards the example grooves 1402. In this example, the example grooves 1402, 1406 exhibit a generally curved or spiral shape. Additionally or alternatively, the example grooves 1402 can extend in a first circumferential direction along the outer surface 1404 and the example grooves 1406 can extend in a second circumferential direction along the inner surface 1408, the second direction different from the first direction.

Figure 16:
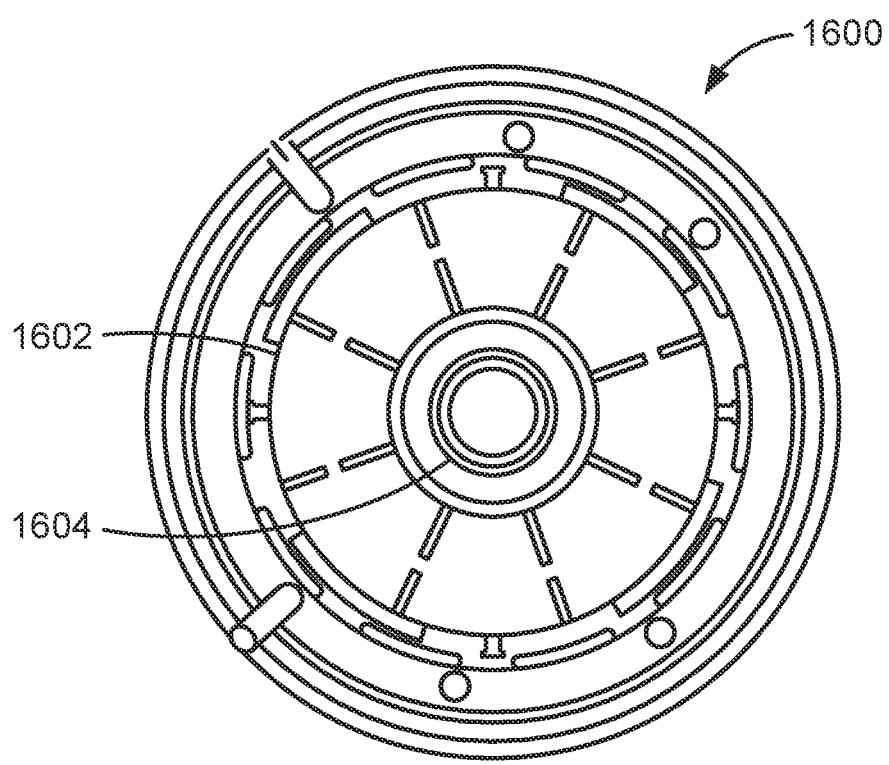
FIG. 16 is an example thrust bearing system in which examples disclosed herein can be implemented.

FIG. 16 illustrates an example bearing system 1600 in which examples disclosed herein can be implemented. The example bearing system 1600 includes an example foil bearing 1602 ("bearing 1602") and an example bore 1604. In some examples, an example shaft is positioned (e.g., placed, inserted, contained, etc.) within the bore 1604. Similar to the example bearing 700 of FIG. 7, the example bearing 1602 of FIG. 16 may include example grooves positioned in an example inner surface of the bearing with example NTE material disposed therein. In some examples, the bearing 1602 is a top foil of the bearing 1602 such that the top foil faces the shaft. As such, the example bearing 1602 can maintain a fluid film between an example shaft positioned within the bore 1604 and the bearing 1602. The formation of the fluid film between the bearing 1602 and the shaft can cause the shaft to return to a center position (e.g., a balanced position) within the bearing 1602. Additionally or alternatively, the example shaft (positioned within the bore 1604) may include example grooves with example NTE material disposed therein. Similar to the example thrust disc 1100 of FIG. 11, the example shaft can include example grooves positioned on an outer surface of the shaft. As such, the example shaft can maintain a fluid film between the shaft and the bearing 1602. The contraction of the NTE material disposed in the grooves of the shaft helps to further in-situ balance the shaft locally (e.g., in regions where the shaft and the bearing 1602 are prone to contact/rub due to dynamics or imbalance). Thus, both the shaft and the bearing 1602 can include grooves with NTE material disposed therein. The NTE material associated with both the shaft and the bearing 1602 can contract to induce a fluid film between the shaft and the bearing 1602, thereby balancing the position of the shaft within the bearing 1602.

Figure 17:
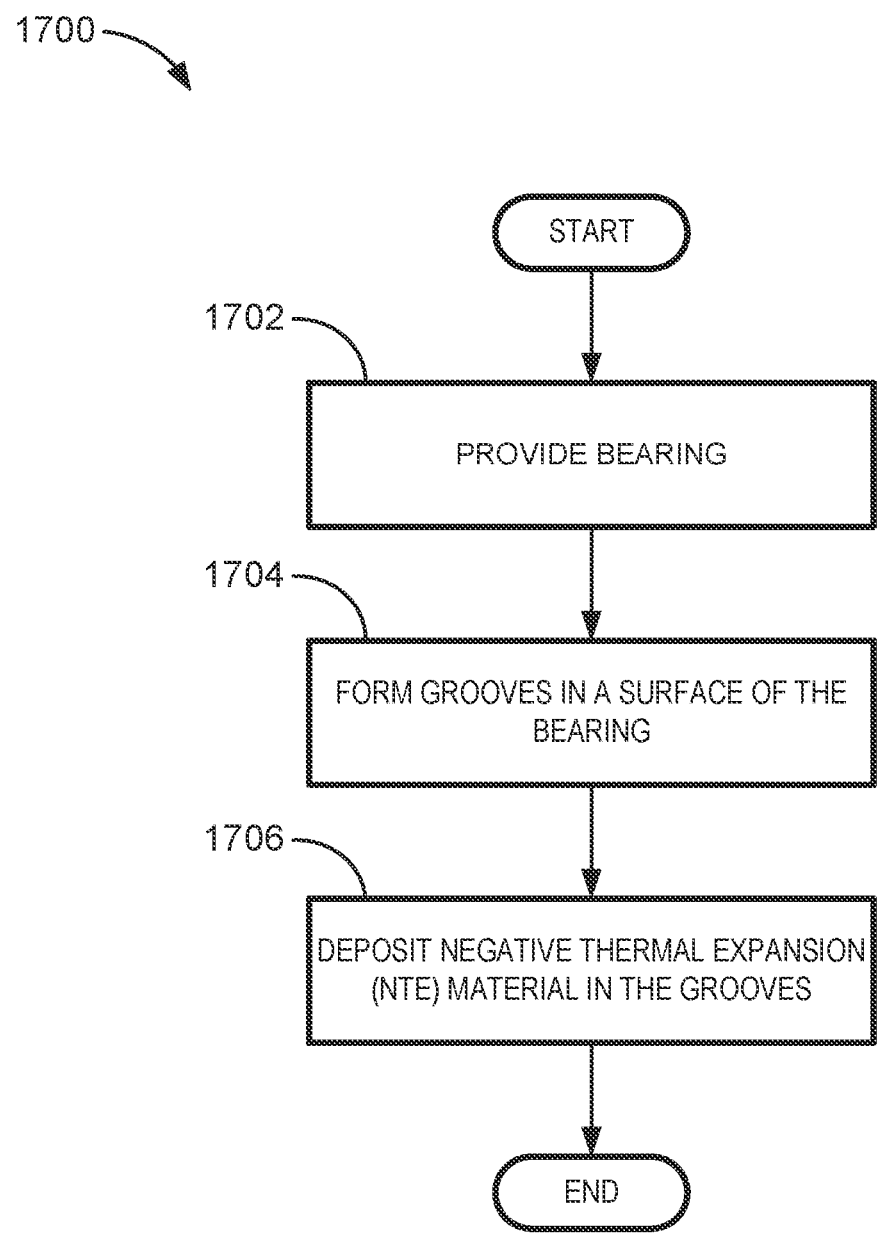
FIG. 17 is a flowchart representative of an example method to manufacture the example bearings or the example thrust discs disclosed herein.

FIG. 17 is a flowchart representative of an example method 1700 to manufacture the example bearings (e.g., the bearings 502, 702, 802, 806, 1400, FIGS. 5-10 and 14-15, respectively) and example thrust discs (e.g., the thrust disc 1100) disclosed herein. In some examples, at least a portion of the example method 1700 is representative of example machine readable instructions that may be executed or instantiated by processor circuitry in communication with manufacturing equipment to manufacture the example bearings or the example thrust discs. Additionally or alternatively, the method 1700 of FIG. 17 may utilize an Application Specific Integrated Circuit (ASIC) and/or a Field Programmable Gate Array (FPGA) structured to cause operations corresponding to the method 1700 to be performed by manufacturing equipment.

The example method 1700 of FIG. 17 begins at block 1702, at which an example bearing is provided. In some examples, at least one of the bearings 502, 702, 802, 806, 1400 is provided. In other examples, the thrust disc 1100 is provided.

At block 1704, example grooves are formed (e.g., etched) in a surface of the example bearing. For example, the example grooves 510 are formed in the first surface 506 of the example bearing 502, the example grooves 706 are formed in the inner surface 714 of the example bearing 702, the example grooves 808 are formed in a surface of the example forward thrust bearing 802, the example grooves 812 are formed in a surface of the example aft thrust bearing 806, the example grooves 1406 are formed in the inner surface 1408 of the bearing 1400, the example grooves 1402 are formed in the outer surface 1404 of the bearing 1400, etc. In some examples, the grooves 1102 are formed in the outer surface 1104 of the thrust disc 1100. In some examples, the grooves 510, 706, 808, 812, 1102, 1406, 1402 (FIGS. 5-15) are finished with nano grinding or nano polishing.

At block 1706, example NTE material is deposited in the example grooves. For example, the NTE material 514 is deposited in the grooves 510 of FIGS. 5-7, the NTE material 708 is deposited in the grooves 706 of FIG. 7, the NTE material 810 is deposited in the grooves 808, 812 of FIGS. 8-10, the NTE material 1410 is deposited in the grooves 1402, and the NTE material 1412 is deposited in the grooves 1406 of FIGS. 14 and 15. In some examples, the NTE material 1106 is deposited in the grooves 1102 of FIGS. 11-13. In some examples, a depth or a thickness of the NTE material 514, 708, 810, 1106, 1410 is measured via ultrasonic gauges, eddy current based gauges, laser based gauges (e.g., light), laser based confocal microscopy, or atomic force microscopy (AFM).

In some examples, the assembly 500, the assembly 700, the thrust bearing system 800, or the bearing system 1600 can include means for supporting. For example, the means for supporting may be implemented by the bearing 502 in FIGS. 5 and 6, the bearing 702 in FIG. 7, the bearings 802, 806 in FIGS. 8-10, the bearing 1108 in FIG. 11, the bearing 1400 in FIGS. 14 and 15, the bearing 1602 in FIG. 16, or any other bearing described herein.

In some examples, the assembly 500 of FIGS. 5 and 6, the assembly 700 of FIG. 7, the thrust bearing system 800 of FIGS. 8-10, the example thrust disc 1100 of FIGS. 11-13, the example bearing 1400 of FIGS. 14 and 15, or the bearing system 1600 of FIG. 16 can include means for contracting. For example, the means for contracting may be implemented by the NTE material 514 in FIGS. 5 and 6, the NTE material 708 in FIG. 7, the NTE material 810 in FIGS. 8-10, the NTE material 1106 in FIGS. 11-13, the NTE material 1410, 1412 in FIG. 14, or any other NTE material described herein.

Bearings with grooves and methods for producing the same are disclosed herein. Example negative thermal expansion (NTE) materials for use with bearings are disclosed herein. Example systems disclosed herein reduce the amount of axial movement that the impeller shaft experiences due to forward and aft thrusts. Example bearing systems disclosed herein can increase the spacing between the impeller shaft and a radial bearing, the spacing between the thrust disc and corresponding thrust pads, etc. Thus, examples disclosed herein can reduce a frequency or magnitude at which the impeller shaft or parts coupled thereto physically contact other part(s) and/or housing(s) of the pump. For example, examples disclosed herein employ a NTE coating deposited in grooves to generate a gap between pump components. Furthermore, example systems disclosed herein can improve the operational efficiency of the pump by minimizing or otherwise reducing frictional energy losses associated with axial impeller shaft movement. Furthermore, the example systems disclosed herein can increase the time between maintenance services to repair and/or replace component(s) of the thrust bearing(s), motor, pump, etc.

Bearings with grooves and methods of producing the same are disclosed herein. Further aspects of the present disclosure are provided by the subject matter of the following clauses:

An apparatus comprising a bearing having a bearing surface with a groove, the bearing positioned adjacent to a shaft, the groove facing the shaft, and a negative thermal expansion (NTE) material positioned in the groove, the NTE material at least partially filling the groove.

The apparatus of any preceding clause, wherein the NTE material includes at least one of zirconium tungstate, zirconium vanadate or niobium-titanium.

The apparatus of any preceding clause, wherein the NTE material is coated on internal surfaces of the groove.

The apparatus of any preceding clause, wherein the bearing is a radial bearing, the radial bearing surrounding the shaft.

The apparatus of any preceding clause, wherein the bearing surface is an inner surface of the radial bearing, wherein the groove extends radially from the inner surface towards an outer surface of the radial bearing.

The apparatus of any preceding clause, wherein the shaft is an impeller shaft of a pump, the impeller shaft coupled to a rotor of a motor, the radial bearing positioned either forward of the motor or aft of the motor.

The apparatus of any preceding clause, wherein the NTE material shrinks in response to the impeller shaft moving relative to at least one of the radial bearing, windage heating, or contact with moving surrounding fluid.

The apparatus of any preceding clause, wherein the bearing is a thrust bearing, further including a thrust disc coupled to the shaft.

The apparatus of any preceding clause, wherein the thrust bearing is at least one of a bearing top foil facing the thrust disc, an aft thrust bearing positioned on an aft side of the thrust disc, or a forward thrust bearing positioned on a forward side of the thrust disc.

The apparatus of any preceding clause, wherein the bearing surface is an outer surface of the thrust disc, and wherein the outer surface faces the thrust bearing.

The apparatus of any preceding clause, wherein the NTE material reduces in size in response to the thrust disc moving relative to the thrust bearing.

The apparatus of any preceding clause, wherein the shaft is an impeller shaft of a pump, the impeller shaft coupled to a rotor of a motor, the thrust bearing positioned forward of the motor.

The apparatus of any preceding clause, wherein the thrust bearing is a first thrust bearing and the groove is a first groove, the apparatus further including a second thrust bearing having a second groove, the second thrust bearing positioned aft of the motor.

The apparatus of any preceding clause, wherein the groove is a first groove and the bearing surface is a first bearing surface, the apparatus further including a second groove positioned in a second bearing surface, the second bearing surface facing away from the first bearing surface, and wherein the first groove extends along a first circumferential direction and the second groove extends along a second circumferential direction different from the first circumferential direction.

An apparatus comprising a bearing having a cavity positioned in a surface of the bearing, the surface at least partially surrounding a longitudinal axis of the apparatus, and a negative thermal expansion (NTE) material positioned in the cavity, the NTE material at least partially filling the cavity.

The apparatus of any preceding clause, wherein the NTE material is coated on one or more walls of the cavity.

The apparatus of any preceding clause, wherein the bearing is a radial bearing, the radial bearing surrounding a shaft, the shaft aligned to the longitudinal axis.

The apparatus of any preceding clause, wherein the NTE material contracts in response to the shaft moving relative to the radial bearing.

The apparatus of any preceding clause, wherein the bearing is a thrust bearing, wherein the thrust bearing is positioned at least partially surrounding a thrust disc.

The apparatus of any preceding clause, wherein the cavity is a first cavity and the NTE material is a first NTE material, wherein the thrust disc further includes a second cavity having a second NTE material disposed therein, the second cavity positioned on an outer surface of the thrust disc, the outer surface of the thrust disc facing the surface of the bearing.

An apparatus comprising at least one surface having a groove, and a negative thermal expansion (NTE) coating at least partially covering one or more walls of the groove, the NTE coating positioned closer to an inner portion of the groove than the at least one surface.

A method comprising providing a bearing, forming grooves in a surface of the bearing, and depositing negative thermal expansion (NTE) material in the grooves.

An apparatus comprising means for supporting having a bearing surface with a groove, the means for supporting positioned adjacent to a shaft, the groove facing the shaft, and means for contracting positioned in the groove, the means for contracting at least partially filling the groove.

The apparatus of any preceding clause, wherein the means for contracting is a negative thermal expansion (NTE) material.

The apparatus of any preceding clause, wherein the means for contracting is coated on internal surfaces of the groove.

The apparatus of any preceding clause, wherein the means for supporting is a radial bearing, the radial bearing surrounding the shaft.

The apparatus of any preceding clause, wherein the bearing surface is an inner surface of the radial bearing, wherein the groove extends radially from the inner surface towards an outer surface of the radial bearing.

The apparatus of any preceding clause, wherein the shaft is an impeller shaft of a pump, the impeller shaft coupled to a rotor of a motor, the radial bearing positioned either forward of the motor or aft of the motor.

The apparatus of any preceding clause, wherein the means for contracting shrinks in response to the impeller shaft moving relative to the radial bearing, windage heating, or contact with moving surrounding thermal fluid.

The apparatus of any preceding clause, wherein the means for supporting is a thrust bearing, further including a thrust disc coupled to the shaft.

The apparatus of any preceding clause, wherein the thrust bearing is at least one of a bearing top foil facing the thrust disc, an aft thrust bearing positioned on an aft side of the thrust disc, or a forward thrust bearing positioned on a forward side of the thrust disc.

The apparatus of any preceding clause, wherein the bearing surface is an outer surface of the thrust disc, and wherein the outer surface faces the thrust bearing.

The apparatus of any preceding clause, wherein the means for contracting reduces in size in response to the thrust disc moving relative to the thrust bearing.

The apparatus of any preceding clause, wherein the shaft is an impeller shaft of a pump, the impeller shaft coupled to a rotor of a motor, the thrust bearing positioned forward of the motor.

The apparatus of any preceding clause, wherein the thrust bearing is a first thrust bearing and the groove is a first groove, the apparatus further including a second thrust bearing having a second groove, the second thrust bearing positioned aft of the motor.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   a bearing having a bearing surface with a groove, the bearing positioned adjacent to a shaft, the groove facing the shaft; and
   a negative thermal expansion (NTE) material positioned in the groove, the NTE material at least partially filling the groove.

2. The apparatus of claim 1, wherein the NTE material includes at least one of zirconium tungstate, zirconium vanadate or niobium-titanium.

3. The apparatus of claim 1, wherein the NTE material is coated on one or more walls of the groove.

4. The apparatus of claim 1, wherein the bearing is a radial bearing, the radial bearing surrounding the shaft.

5. The apparatus of claim 4, wherein the bearing surface is an inner surface of the radial bearing, wherein the groove extends radially from the inner surface towards an outer surface of the radial bearing.

6. The apparatus of claim 4, wherein the shaft is an impeller shaft of a pump, the impeller shaft coupled to a rotor of a motor, the radial bearing positioned either forward of the motor or aft of the motor.

7. The apparatus of claim 6, wherein the NTE material shrinks in response to the impeller shaft moving relative to at least one of the radial bearing, windage heating, or contact with moving surrounding thermal fluid.

8. The apparatus of claim 1, wherein the bearing is a thrust bearing, further including a thrust disc coupled to the shaft.

9. The apparatus of claim 8, wherein the thrust bearing is at least one of a bearing top foil facing the thrust disc, an aft thrust bearing positioned on an aft side of the thrust disc, or a forward thrust bearing positioned on a forward side of the thrust disc.

10. The apparatus of claim 8, wherein the bearing surface is an outer surface of the thrust disc, and wherein the outer surface faces the thrust bearing.

11. The apparatus of claim 8, wherein the NTE material reduces in size in response to the thrust disc moving relative to the thrust bearing.

12. The apparatus of claim 8, wherein the shaft is an impeller shaft of a pump, the impeller shaft coupled to a rotor of a motor, the thrust bearing positioned forward of the motor.

13. The apparatus of claim 12, wherein the thrust bearing is a first thrust bearing and the groove is a first groove, the apparatus further including a second thrust bearing having a second groove, the second thrust bearing positioned aft of the motor.

14. An apparatus comprising:
   a bearing having a cavity positioned in a surface of the bearing, the surface at least partially surrounding a longitudinal axis of the apparatus; and
   a negative thermal expansion (NTE) material positioned in the cavity, the NTE material at least partially filling the cavity.

15. The apparatus of claim 14, wherein the NTE material is coated on one or more walls of the cavity.

16. The apparatus of claim 14, wherein the bearing is a radial bearing, the radial bearing surrounding a shaft, the shaft aligned to the longitudinal axis.

17. The apparatus of claim 16, wherein the NTE material contracts in response to the shaft moving relative to the radial bearing.

18. The apparatus of claim 14, wherein the bearing is a thrust bearing, wherein the thrust bearing is positioned at least partially surrounding a thrust disc.

19. The apparatus of claim 18, wherein the cavity is a first cavity and the NTE material is a first NTE material, wherein the thrust disc further includes a second cavity having a second NTE material disposed therein, the second cavity positioned on an outer surface of the thrust disc, the outer surface of the thrust disc facing the surface of the bearing.

20. An apparatus comprising:
   at least one surface having a groove; and
   a negative thermal expansion (NTE) coating at least partially covering one or more walls of the groove, the NTE coating positioned closer to an inner portion of the groove than the at least one surface.

* * * * *

UNITED STATES PATENT AND TRADEMARK OFFICE
CERTIFICATE OF CORRECTION

Page 1 of 1

PATENT NO. : 12,429,086 B2
APPLICATION NO. : 18/456244
DATED : September 30, 2025
INVENTOR(S) : Mathew et al.

It is certified that error appears in the above-identified patent and that said Letters Patent is hereby corrected as shown below:

In the Drawings

Sheet 3, Figure 3, Field 206, Delete: "EXHANGER" and Insert --EXCHANGER--

Signed and Sealed this
Eleventh Day of November, 2025

John A. Squires
*Director of the United States Patent and Trademark Office*